US011509429B2

(12) United States Patent
Basu Mallick et al.

(10) Patent No.: US 11,509,429 B2
(45) Date of Patent: *Nov. 22, 2022

(54) INITIAL AND RETRANSMISSIONS OF DATA FOR V2X TRANSMISSIONS

(71) Applicant: Panasonic Intellectual Property Corporation of America, Torrance, CA (US)

(72) Inventors: Prateek Basu Mallick, Hessen (DE); Joachim Loehr, Hessen (DE); Sujuan Feng, Frankfurt (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,371

(22) Filed: Apr. 12, 2021

(65) Prior Publication Data

US 2021/0258108 A1    Aug. 19, 2021

Related U.S. Application Data

(63) Continuation of application No. 16/324,072, filed as application No. PCT/EP2017/069301 on Jul. 31, 2017, now Pat. No. 11,005,607.

(30) Foreign Application Priority Data

Aug. 9, 2016  (EP) .................................... 16183360

(51) Int. Cl.
*H04W 4/70*   (2018.01)
*H04L 1/18*   (2006.01)
(Continued)

(52) U.S. Cl.
CPC .......... *H04L 1/1887* (2013.01); *H04L 1/1893* (2013.01); *H04W 4/40* (2018.02);
(Continued)

(58) Field of Classification Search
CPC ...... H04L 1/1887; H04L 1/1893; H04W 4/70; H04W 4/40; H04W 72/02; H04W 72/044
See application file for complete search history.

(56) References Cited

U.S. PATENT DOCUMENTS

2005/0118992 A1    6/2005  Jeong et al.
2015/0215903 A1*   7/2015  Zhao ..................... H04W 72/02
                                                  370/329
(Continued)

FOREIGN PATENT DOCUMENTS

EP    2 983 425 A1    2/2016
WO    2015/142066 A1  9/2018

OTHER PUBLICATIONS

3GPP TR 21.905 V13.0.0, "3$^{rd}$ Generation Partnership Project; Technical Specification Group Services and System Aspects; Vocabulary for 3GPP Specifications (Release 13)," Dec. 2015, 64 pages.
(Continued)

*Primary Examiner* — Lakeram Jangbahadur
(74) *Attorney, Agent, or Firm* — Seed IP Law Group LLP

(57) ABSTRACT

The invention relates to a transmitting device for performing an initial and one or more retransmissions of data via a sidelink interface. A receiver and processor perform a resource sensing procedure to acquire information about radio resources usable for the device to transmit data at a later point in time. The processor performs an autonomous radio resource allocation to select time-frequency radio resources within a transmission window to be used for performing a first transmission of the data, based on information acquired by the resource sensing procedure. The
(Continued)

processor determines a data transmission timing pattern, that indicates a transmission timing for performing one or more transmissions of data. A transmitter performs the first data transmission using the selected time-frequency radio resources and performs the data retransmissions at the transmission timing defined by the determined data transmission timing pattern with respect to the first data transmission.

12 Claims, 11 Drawing Sheets

(51) Int. Cl.
  *H04W 4/40*  (2018.01)
  *H04W 72/02*  (2009.01)
  *H04W 72/04*  (2009.01)
(52) U.S. Cl.
  CPC .............. *H04W 4/70* (2018.02); *H04W 72/02* (2013.01); *H04W 72/044* (2013.01)

(56) References Cited

U.S. PATENT DOCUMENTS

| | | | |
|---|---|---|---|
| 2015/0334760 | A1* | 11/2015 | Sartori ............... H04W 72/085 370/329 |
| 2016/0381666 | A1* | 12/2016 | Kim .................. H04W 72/0446 370/329 |
| 2017/0230928 | A1 | 8/2017 | Basu Mallick et al. |
| 2018/0359749 | A1 | 12/2018 | Liu et al. |

OTHER PUBLICATIONS

3GPP TR 23.713 V13.0.0, "3rd Generation Partnership Project; Technical Specification Group Services and System Aspects; Study on extended architecture support for proximity-based services (Release 13)," Sep. 2015, 80 pages.
3GPP TS 23.303 V13.2.0, "3$^{rd}$ Generation Partnership Project; Technical Specification Group Services and System Aspects; Proximity-based services (ProSe); Stage 2 (Release 13)," Dec. 2015, 122 pages.
3GPP TS 36.211 V8.9.0, "3$^{rd}$ Generation Partnership Project; Technical Specification Group Radio Access Network; Evolved Universal Terrestrial Radio Access (E-UTRA); Physical channels and modulation (Release 8)," Dec. 2009, 83 pages.
3GPP TS 36.211 V13.1.0, "3$^{rd}$ Generation Partnership Project; Technical Specification Group Radio Access Network; Evolved Universal Terrestrial Radio Access (E-UTRA); Physical channels and modulation (Release 13)," Mar. 2016, 155 pages.
3GPP TS 36.212 V13.1.0, "3rd Generation Partnership Project; Technical Specification Group Radio Access Network; Evolved Universal Terrestrial Radio Access (E-UTRA); Multiplexing and channel coding (Release 13)," Mar. 2016, 129 pages.
3GPP TS 36.213 V13.1.1, "3rd Generation Partnership Project; Technical Specification Group Radio Access Network; Evolved Universal Terrestrial Radio Access (E-UTRA); Physical layer procedures (Release 13)," Mar. 2016, 361 pages.
3GPP TS 36.300 V13.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Mar. 2016, 295 pages.
3GPP TS 36.321 V13.2.0, "3rd Generation Partnership Project; Technical Specification Group Radio Access Network; Evolved Universal Terrestrial Radio Access (E-UTRA); Medium Access Control (MAC) protocol specification (Release 13)," Jun. 2016, 91 pages.
ETSI TS 102 687 V1.1.1, "Intelligent Transport Systems (ITS); Decentralized Congestion Control Mechanisms for Intelligent Transport Systems operating in the 5 GHz range; Access layer part," Jul. 2011, 45 pages.
ETSI EN 302 571 V2.0.0, "Intelligent Transport Systems (ITS); Radiocommunications equipment operating in the 5 855 MHz to 5 925 MHz frequency band; Harmonised Standard covering the essential requirements of article 3.2 of Directive 2014/53/EU," Mar. 2016, 45 pages.
ETSI EN 302 637-2 V1.3.1, "Intelligent Transport Systems (ITS); Vehicular Communications; Basic Set of Applications; Part 2: Specification of Cooperative Awareness Basic Service," Sep. 2014, 44 pages.
ETSI EN 302 637-3 V1.2.1, "Intelligent Transport Systems (ITS); Vehicular Communications; Basic Set of Applications; Part 3: Specifications of Decentralized Environmental Notification Basic Service," Sep. 2014, 73 pages.
European Search Report, dated Feb. 14, 2017, for the related European Application No. EP 16 18 3360, 1 page.
Ericsson LM, MediaTek Inc., "Correction of 3GPP vocabulary due to renaming to EC-GSM-IoT," SP-160466, 3GPP TSG-GERAN Meeting #70, Nanjing, China, May 23-27, 2016, 3 pages.
International Search Report, dated Oct. 6, 2017, for the related International Application No. PCT/EP2017/069301, 3 pages.
Malaysian Office Action, dated Sep. 5, 2022, for Malaysian Patent Application No. PI 2019000062. (3 pages).

* cited by examiner

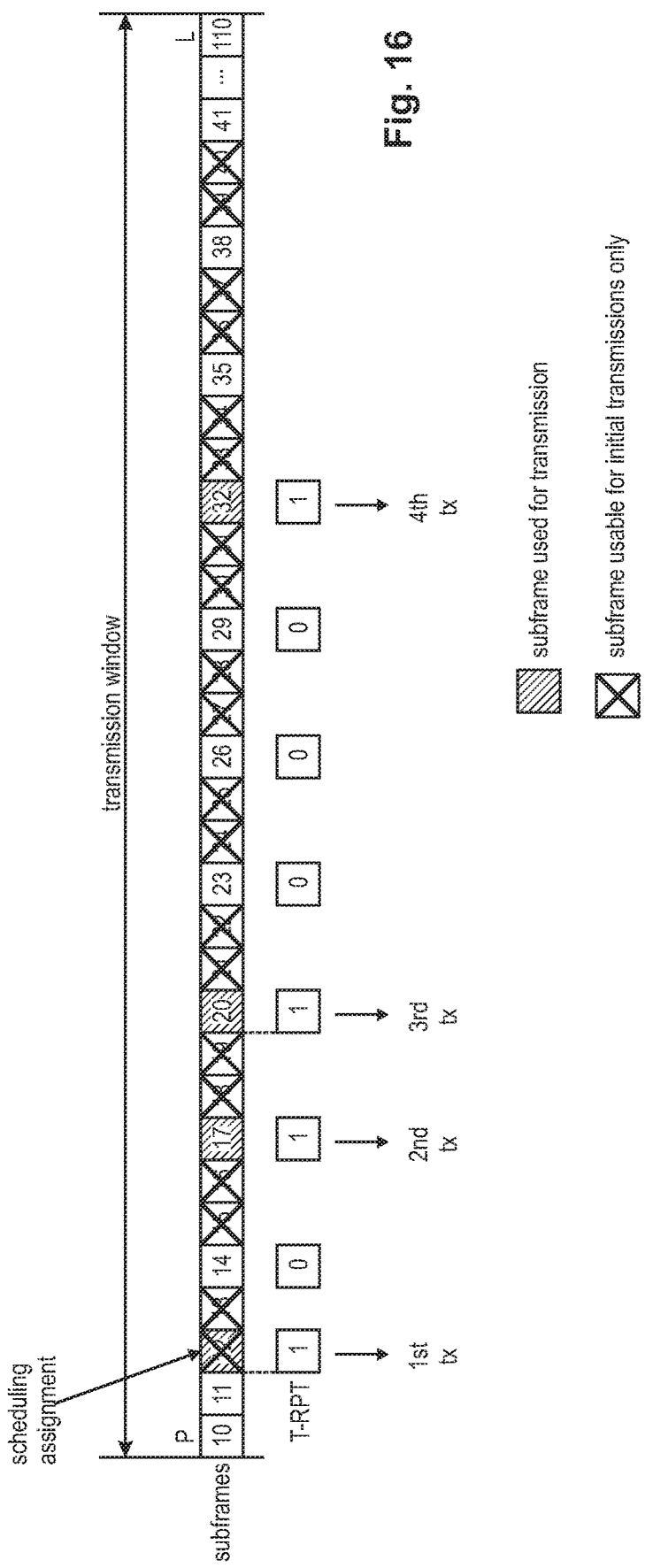

INITIAL AND RETRANSMISSIONS OF DATA FOR V2X TRANSMISSIONS

BACKGROUND

Technical Field

The present disclosure relates to improved data transmissions and resource allocation via the sidelink interface. The present disclosure is providing the corresponding methods and devices for the disclosure.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}=110$ are respectively the smallest and the largest downlink bandwidths, supported by the current version of the specification. $N_{sc}^{RB}$ is the number of subcarriers within one resource block. For normal cyclic prefix subframe structure, $N_{sc}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource blockA physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", current version 13.1.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, then n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

MAC Layer/Entity, RRC Layer, Physical Layer

The LTE layer 2 user-plane/control-plane protocol stack comprises four sublayers, RRC, PDCP, RLC and MAC. The Medium Access Control (MAC) layer is the lowest sublayer in the Layer 2 architecture of the LTE radio protocol stack and is defined by e.g., the 3GPP technical standard TS 36.321, current version 13.2.0. The connection to the physical layer below is through transport channels, and the connection to the RLC layer above is through logical channels. The MAC layer therefore performs multiplexing and demultiplexing between logical channels and transport channels: the MAC layer in the transmitting side constructs MAC PDUs, known as transport blocks, from MAC SDUs received through logical channels, and the MAC layer in the receiving side recovers MAC SDUs from MAC PDUs received through transport channels.

The MAC layer provides a data transfer service (see subclauses 5.4 and 5.3 of TS 36.321 incorporated herein by reference) for the RLC layer through logical channels, which are either control logical channels which carry control data (e.g., RRC signaling) or traffic logical channels which carry user plane data. On the other hand, the data from the MAC layer is exchanged with the physical layer through transport channels, which are classified as downlink or uplink. Data is multiplexed into transport channels depending on how it is transmitted over the air.

The Physical layer is responsible for the actual transmission of data and control information via the air interface, i.e., the Physical Layer carries all information from the MAC transport channels over the air interface on the transmission side. Some of the important functions performed by the Physical layer include coding and modulation, link adaptation (AMC), power control, cell search (for initial synchronization and handover purposes) and other measurements (inside the LTE system and between systems) for the RRC layer. The Physical layer performs transmissions based on transmission parameters, such as the modulation scheme, the coding rate (i.e., the modulation and coding scheme, MCS), the number of physical resource blocks etc. More information on the functioning of the physical layer can be found in the 3GPP technical standard 36.213 current version 13.1.1, incorporated herein by reference.

The Radio Resource Control (RRC) layer controls communication between a UE and an eNB at the radio interface and the mobility of a UE moving across several cells. The RRC protocol also supports the transfer of NAS information. For UEs in RRC IDLE, RRC supports notification from the network of incoming calls. RRC connection control covers all procedures related to the establishment, modification and release of an RRC connection, including paging, measurement configuration and reporting, radio resource configuration, initial security activation, and establishment of Signaling Radio Bearer (SRBs) and of radio bearers carrying user data (Data Radio Bearers, DRBs).

The radio link control (RLC) sublayer comprises mainly ARQ functionality and supports data segmentation and concatenation, i.e., RLC layer performs framing of RLC SDUs to put them into the size indicated by the MAC layer. The latter two minimize the protocol overhead independently from the data rate. The RLC layer is connected to the MAC layer via logical channels. Each logical channel transports different types of traffic. The layer above RLC layer is typically the PDCP layer, but in some cases it is the RRC layer, i.e., RRC messages transmitted on the logical channels BCCH (Broadcast Control Channel), PCCH (Paging Control Channel) and CCCH (Common Control Channel) do not require security protection and thus go directly to the RLC layer, bypassing the PDCP layer.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and improved coverage (higher data rates for a given terminal peak power). During each time interval, eNodeB assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (eNodeB), aided by insertion of a cyclic prefix in the transmitted signal.

The basic physical resource used for data transmission consists of a frequency resource of size BWgrant during one time interval, e.g., a subframe, onto which coded information bits are mapped. It should be noted that a subframe, also referred to as transmission time interval (TTI), is the smallest time interval for user data transmission. It is however possible to assign a frequency resource BWgrant over a longer time period than one TTI to a user by concatenation of subframes.

Layer 1/Layer 2 Control Signaling

In order to inform the scheduled users about their allocation status, transport format, and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. Several PDCCHs can be transmitted in one subframe.

Generally, the information sent in the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (e.g., Resource Blocks, RBs) on which a user is allocated. Alternatively, this information is termed resource block assignment (RBA). Note, that the number of RBs on which a user is allocated can be dynamic;

Carrier indicator, which is used if a control channel transmitted on a first carrier assigns resources that concern a second carrier, i.e., resources on a second carrier or resources related to a second carrier; (cross carrier scheduling);

Modulation and coding scheme that determines the employed modulation scheme and coding rate;

HARQ information, such as a new data indicator (NDI) and/or a redundancy version (RV) that is particularly useful in retransmissions of data packets or parts thereof; Power control commands to adjust the transmit power of the assigned uplink data or control information transmission;

Reference signal information such as the applied cyclic shift and/or orthogonal cover code index, which are to be employed for transmission or reception of reference signals related to the assignment; Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding", section 5.3.3.1 (current version v13.1.0 available at http://www.3gpp.org and incorporated herein by reference). The 3GPP technical standard TS 36.212, current version 13.1.0, defines in subclause 5.4.3, incorporated herein by reference, control information for the sidelink interface.

Semi-Persistent Scheduling (SPS)

In the downlink and uplink, the scheduling eNodeB dynamically allocates resources to user equipments at each transmission time interval via the L1/L2 control channel(s) (PDCCH) where the user equipments are addressed via their specific C-RNTIs. As already mentioned before, the CRC of a PDCCH is masked with the addressed user equipment's C-RNTI (so-called dynamic PDCCH). Only a user equipment with a matching C-RNTI can decode the PDCCH content correctly, i.e., the CRC check is positive. This kind of PDCCH signaling is also referred to as dynamic (scheduling) grant. A user equipment monitors at each transmission time interval the L1/L2 control channel(s) for a dynamic grant in order to find a possible allocation (downlink and uplink) it is assigned to.

In addition, E-UTRAN can allocate uplink/downlink resources for initial HARQ transmissions persistently. When required, retransmissions are explicitly signaled via the L1/L2 control channel(s). Since retransmissions are dynamically scheduled, this kind of operation is referred to as semi-persistent scheduling (SPS), i.e., resources are allocated to the user equipment on a semi-persistent basis (semi-persistent resource allocation). The benefit is that PDCCH resources for initial HARQ transmissions are saved. Semi-persistent scheduling may be used in the PCell in Release 10, but not in an SCell.

One example for a service, which might be scheduled using semi-persistent scheduling, is Voice over IP (VoIP). Every 20 ms a VoIP packet is generated at the codec during a talk-spurt. Therefore, eNodeB could allocate uplink or respectively downlink resources persistently every 20 ms, which could be then used for the transmission of Voice over IP packets. In general, semi-persistent scheduling is beneficial for services with a predictable traffic behavior, i.e., constant bit rate, packet arrival time is periodic.

The user equipment also monitors the PDCCHs in a subframe where it has been allocated resources for an initial transmission persistently. A dynamic (scheduling) grant, i.e., PDCCH with a C-RNTI-masked CRC, can override a semi-persistent resource allocation. In case the user equipment finds its C-RNTI on the L1/L2 control channel(s) in the sub-frames where the user equipment has a semi-persistent resource assigned, this L1/L2 control channel allocation overrides the persistent resource allocation for that transmission time interval, and the user equipment does follow the dynamic grant. When a user equipment does not find a dynamic grant, it will transmit/receive according to the semi-persistent resource allocation.

The configuration of semi-persistent scheduling is done by RRC signaling. For example the periodicity, e.g., PS_PERIOD, of the persistent allocation is signaled within Radio resource Control (RRC) signaling. The activation of a persistent allocation and also the exact timing as well as the physical resources and transport format parameters are sent via PDCCH signaling. Once semi-persistent scheduling is activated, the user equipment follows the semi-persistent resource allocation according to the SPS activation PDCCH every PS_PERIOD. Essentially, the user equipment stores the SPS activation PDCCH content and follows the PDCCH with the signaled periodicity.

In order to distinguish a dynamic PDCCH from a PDCCH which activates semi-persistent scheduling (also referred to as SPS activation PDCCH), a separate identity is introduced. Basically, the CRC of an SPS activation PDCCH is masked with this additional identity which is in the following referred to as SPS C-RNTI. The size of the SPS C-RNTI is also 16 bits, same as the normal C-RNTI. Furthermore, the SPS C-RNTI is also user equipment-specific, i.e., each user equipment configured for semi-persistent scheduling is allocated a unique SPS C-RNTI.

In case a user equipment detects that a semi-persistent resource allocation is activated by a corresponding SPS activation PDCCH, the user equipment will store the PDCCH content (i.e., the semi-persistent resource assignment) and apply it every semi-persistent scheduling interval, i.e., periodicity signaled via RRC. As already mentioned, a dynamic allocation, i.e., signaled on dynamic PDCCH, is only a "one-time allocation". Retransmissions of an SPS allocation are also signaled using the SPS C-RNTI. In order to distinguish the SPS activation from an SPS re-transmission, the NDI (new data indicator) bit is used. An SPS activation is indicated by setting the NDI bit to 0. An SPS PDCCH with the NDI-bit set to 1 indicates a re-transmission for a semi-persistently scheduled initial transmission.

Similar to the activation of semi-persistent scheduling, the eNodeB also can deactivate semi-persistent scheduling, also called SPS resource release. There are several options how a semi-persistent scheduling de-allocation can be signaled. One option would be to use PDCCH signaling with some PDCCH fields set to some predefined values, i.e., SPS PDCCH indicating a zero size resource allocation. Another option would be to use MAC control signaling.

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE allows the 3GPP industry to serve this developing market and will, at the same time, serve the urgent needs of several Public Safety communities that are jointly committed to LTE.

Device-to-Device (D2D) communication is a technology component introduced by LTE-Rel.12, which allows D2D as an underlay to the cellular network to increase the spectral efficiency. For example, if the cellular network is LTE, all data-carrying physical channels use SC-FDMA for D2D signaling. In D2D communications, user equipments transmit data signals to each other over a direct link using the cellular resources instead of through the radio base station. Throughout the disclosure the terms "D2D", "ProSe" and "sidelink" are interchangeable.

The D2D communication in LTE is focusing on two areas: Discovery and Communication.

ProSe (Proximity-based Services) Direct Discovery is defined as the procedure used by the ProSe-enabled UE to discover other ProSe-enabled UE(s) in its proximity using E-UTRA direct radio signals via the PC5 interface.

In D2D communication, UEs transmit data signals to each other over a direct link using the cellular resources instead of through the base station (BS). D2D users communicate directly while remaining controlled under the B S, i.e., at least when being in coverage of an eNB. Therefore, D2D can improve system performance by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible.

In D2D communication, when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

ProSe Direct Communication Layer-2 Link

In brief, ProSe direct one-to-one communication is realized by establishing a secure layer-2 link over PC5 between two UEs. Each UE has a Layer-2 ID for unicast communication that is included in the Source Layer-2 ID field of every frame that it sends on the layer-2 link and in the Destination Layer-2 ID of every frame that it receives on the layer-2 link. The UE needs to ensure that the Layer-2 ID for unicast communication is at least locally unique. So the UE should be prepared to handle Layer-2 ID conflicts with adjacent UEs using unspecified mechanisms (e.g., self-assign a new Layer-2 ID for unicast communication when a conflict is detected). The layer-2 link for ProSe direct communication one-to-one is identified by the combination of the Layer-2 IDs of the two UEs. This means that the UE can engage in multiple layer-2 links for ProSe direct communication one-to-one using the same Layer-2 ID.

ProSe direct communication one-to-one is composed of the following procedures as explained in detail in TR 23.713 current version v13.0.0 section 7.1.2 incorporated herein by reference:

Establishment of a secure layer-2 link over PC5.
IP address/prefix assignment.
Layer-2 link maintenance over PC5.
Layer-2 link release over PC5.

FIG. 3 illustrates how to establish a secure layer-2 link over the PC5 interface.

1. UE-1 sends a Direct Communication Request message to UE-2 in order to trigger mutual authentication. The link initiator (UE-1) needs to know the Layer-2 ID of the peer (UE-2) in order to perform step 1. As an example, the link initiator may learn the Layer-2 ID of the peer by executing a discovery procedure first or by having participated in ProSe one-to-many communication including the peer.
2. UE-2 initiates the procedure for mutual authentication. The successful completion of the authentication procedure completes the establishment of the secure layer-2 link over PC5.

UEs engaging in isolated (non-relay) one-to-one communication may also use link-local addresses. The PC5 Signaling Protocol shall support keep-alive functionality that is used to detect when the UEs are not in ProSe Communication range, so that they can proceed with implicit layer-2 link release. The Layer-2 link release over the PC5 can be performed by using a Disconnect Request message transmitted to the other UE, which also deletes all associated context data. Upon reception of the Disconnect Request message, the other UE responds with a Disconnect Response message and deletes all context data associated with the layer-2 link.

ProSe Direct Communication Related identities

3GPP TS 36.300, current version 13.3.0, defines in sub-clause 8.3 the following identities to use for ProSe Direct Communication:

SL-RNTI: Unique identification used for ProSe Direct Communication Scheduling;

Source Layer-2 ID: Identifies the sender of the data in sidelink ProSe Direct Communication. The Source Layer-2 ID is 24 bits long and is used together with ProSe Layer-2 Destination ID and LCD for identification of the RLC UM entity and PDCP entity in the receiver;

Destination Layer-2 ID: Identifies the target of the data in sidelink ProSe Direct Communication. The Destination Layer-2 ID is 24 bits long and is split in the MAC layer into two bit strings:

One bit string is the LSB part (8 bits) of Destination Layer-2 ID and forwarded to the physical layer as Sidelink Control Layer-1 ID. This identifies the target of the intended data in Sidelink Control and is used for filtering packets at the physical layer.

Second bit string is the MSB part (16 bits) of the Destination Layer-2 ID and is carried within the MAC header. This is used for filtering packets at the MAC layer.

No Access Stratum signaling is required for group formation and to configure Source Layer-2 ID, Destination Layer-2 ID and Sidelink Control L1 ID in the UE. These identities are either provided by a higher layer or derived from identities provided by a higher layer. In case of groupcast and broadcast, the ProSe UE ID provided by the higher layer is used directly as the Source Layer-2 ID, and the ProSe Layer-2 Group ID provided by the higher layer is used directly as the Destination Layer-2 ID in the MAC layer. In case of one-to-one communications, higher layer provides Source Layer-2 ID and Destination Layer-2 ID.

Radio Resource Allocation for Proximity Services

From the perspective of a transmitting UE, a Proximity-Services-enabled UE (ProSe-enabled UE) can operate in two modes for resource allocation:

Mode 1 refers to the eNB-scheduled resource allocation mode, where the UE requests transmission resources from the eNB (or Release-10 relay node), and the eNodeB (or Release-10 relay node) in turn schedules the resources used by a UE to transmit direct data and direct control information (e.g., Scheduling Assignment). The UE needs to be RRC CONNECTED in order to transmit data. In particular, the UE sends a scheduling request (D-SR or Random Access) to the eNB followed by a sidelink buffer status report (BSR) in the usual manner (see also following chapter "Transmission procedure for D2D communication"). Based on the BSR, the eNB can determine that the UE has data for a ProSe Direct Communication transmission and can estimate the resources needed for transmission.

On the other hand, Mode 2 refers to the UE-autonomous resource selection mode, where a UE on its own selects resources (time and frequency) from resource pool(s) to transmit direct data and direct control information (i.e., SA). At least one resource pool is defined e.g., by the content of SIB18, namely by the field commTxPoolNormalCommon, these particular resource pool(s) being broadcast in the cell and then commonly available for all UEs in the cell still in RRC Idle state. Effectively, the eNB may define up to four different instances of said pool, respectively four resource pools for the transmission of SA messages and direct data. However, in Rel-12 a UE shall always use the first resource pool defined in the list, even if it was configured with multiple resource pools. This restriction was removed for Rel-13, i.e., a UE can transmit on multiple of the configured resource pools within one SC period. How the UE selects the resource pools for transmission is further outlined below (further specified in TS36.321).

As an alternative, another resource pool can be defined by the eNB and signaled in SIB18, namely by using the field commTxPoolExceptional, which can be used by the UEs in exceptional cases.

What resource allocation mode a UE is going to use is configurable by the eNB. Furthermore, what resource allocation mode a UE is going to use for D2D data communication may also depend on the RRC state, i.e., RRC IDLE or RRC CONNECTED, and the coverage state of the UE, i.e., in-coverage, out-of-coverage. A UE is considered in-coverage if it has a serving cell (i.e., the UE is RRC CONNECTED or is camping on a cell in RRC IDLE).

FIG. 4 illustrates the use of transmission/reception resources for overlay (LTE) and underlay (D2D) system.

Basically, the eNodeB controls whether UE may apply the Mode 1 or Mode 2 transmission. Once the UE knows its resources where it can transmit (or receive) D2D communication, it uses the corresponding resources only for the corresponding transmission/reception. For example, in FIG. 4 the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 4 can be used for LTE (overlay) transmissions and/or reception.

Transmission procedure for D2D communication

The D2D data transmission procedure according to Rel. 12/13 differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e., resource pool) are provided; this may be done e.g., with the exchange of the D2D communication Interest Indication by the UE and the corresponding response, D2D Communication Response, where the corresponding exemplary ProseCommConfig information element would not include the commTxPoolNormalCommon, meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

Step 1: UE sends SR (Scheduling Request) to eNB via PUCCH;
Step 2: eNB grants UL resource (for UE to send sidelink BSR) via PDCCH, scrambled by C-RNTI;
Step 3: UE sends D2D/sidelink BSR indicating the buffer status via PUSCH;
Step 4: eNB grants D2D resource (for UE to send data) via PDCCH, scrambled by D2D-RNTI.
Step 5: D2D Tx UE transmits SA/D2D data according to grant received in step 4.

A Scheduling Assignment (SA), also termed SCI (Sidelink Control Information) is a compact (low-payload) message containing control information, e.g., pointer(s) to time-frequency resources, modulation and coding scheme and Group Destination ID for the corresponding D2D data transmission. An SCI transports the sidelink scheduling information for one (ProSe) destination ID. The content of the SA (SCI) is basically in accordance with the grant received in Step 4 above. The D2D grant and SA content (i.e., SCI content) are defined in the 3GPP technical standard 36.212, current version 13.1.0, subclause 5.4.3, incorporated herein by reference, defining in particular the SCI format 0 (see content of SCI format 0 above).

On the other hand, for Mode 2 resource allocation, above steps 1-4 are basically not necessary, and the UE autonomously selects radio resources for the SA and D2D data transmission from the transmission resource pool(s) configured and provided by the eNB.

FIG. 5 exemplarily illustrates the transmission of the Scheduling Assignment and the D2D data for two UEs, UE-1 and UE-2, where the resources for sending the scheduling assignments are periodic, and the resources used for the D2D data transmission are indicated by the corresponding Scheduling Assignment.

FIG. 6 illustrates one specific example of the D2D communication timing for Mode 2, autonomous scheduling, during one SA/data period, also known as SC period, Sidelink Control period. FIG. 7 illustrates the D2D communication timing for Mode 1, eNB-scheduled allocation during one SA/data period. In Rel. 13, 3GPP defined an SC period as being the time period consisting of transmission of a Scheduling Assignment and its corresponding data. As can be seen from FIG. 6, the UE transmits after an SA-offset time, a Scheduling Assignment using the transmission pool resources for scheduling assignments for Mode 2, SA_Mode2_Tx_pool. The 1st transmission of the SA is followed e.g., by three retransmissions of the same SA message. Then, the UE starts the D2D data transmission, i.e., more in particular the T-RPT bitmap/pattern, at some configured offset (Mode2data_offset) after the first subframe of the SA resource pool (given by the SA_offset). One D2D data transmission of a MAC PDU (i.e., a transport block) consists of its 1st initial transmission and several retransmissions. For the illustration of FIG. 6 (and of FIG. 7) it is assumed that three retransmissions are performed (i.e., 2nd, 3rd, and 4th transmission of the same MAC PDU). The Mode2 T-RPT Bitmap (time resource pattern of transmission, T-RPT) basically defines the timing of the MAC PDU transmission (1st transmission) and its retransmissions ($2^{nd}$, $3^{rd}$ and $4^{th}$ transmission). The SA pattern basically defines the timing of the SA's initial transmission and its retransmissions ($2^{nd}$, $3^{rd}$, and $4^{th}$ transmission). More information on the T-RPT can be found in the 3GPP technical standard 36.213 v.13.1.1, particularly in section 14 "UE procedures related to the Sidelink", incorporated herein by reference.

As currently specified in the standard, for one sidelink grant, e.g., either sent by the eNB or selected by the UE itself, the UE can transmit multiple transport blocks, MAC PDUs, (only one per subframe (TTI), i.e., one after the other), however to only one ProSe destination group. Also the retransmissions of one transport block must be finished before the first transmission of the next transport block starts, i.e., only one HARQ process is used per sidelink grant for the transmission of the multiple transport blocks. Furthermore, the UE can have and use several sidelink grants per SC period, but a different ProSe destination be selected for each of them. Thus, in one SC period the UE can transmit data to one ProSe destination only one time.

As apparent from FIG. 7, for the eNB-scheduled resource allocation mode (Mode 1), the D2D data transmission, i.e., more in particular the T-RPT pattern/bitmap, starts in the next UL subframe after the last SA transmission repetition in the SA resource pool. As explained already for FIG. 6, the Model T-RPT Bitmap (time resource pattern of transmission, T-RPT) basically defines the timing of the MAC PDU transmission (1st transmission) and its retransmissions (2nd, 3rd, and 4th transmission).

The sidelink data transmission procedure can be found in the 3GPP standard document TS 36.321 v13.2.0, section 5.14, incorporated herein by reference. Therein, the Mode-2 autonomous resource selection is described in detail, differentiating between being configured with a single radio resource pool or multiple radio resource pools.

What is discussed above is the current status of the 3GPP standard for the D2D communication. However, it should be noted that there has been ongoing discussions on how to further improve and enhance the D2D communication which will likely result in that some changes are introduced to the D2D communication in future releases. The present disclosure as will be described later shall be also applicable to those later releases.

For example, for 3GPP Rel. 14 which is currently under development, 3GPP may decide to change the transmission timing so as to no longer be based on SC periods as discussed above, but differently (e.g., based on subframes same/similar to Uu interface transmissions). Correspondingly, the above detailed examples on how transmissions over the sidelink (PC5) interface can be performed are merely exemplary and may apply to Rel. 13, but possibly not for later releases of the corresponding 3GPP standards.

Furthermore, in future releases of the D2D framework, particularly in connection with vehicular communication, transmissions based on fixed T-RPTs might not be used anymore.

ProSe Network Architecture and ProSe entities

FIG. 8 illustrates a high-level exemplary architecture for a non-roaming case, including different ProSe applications in the respective UEs A and B, as well as a ProSe Application Server and ProSe function in the network. The example architecture of FIG. 8 is taken from TS 23.303 v.13.2.0 chapter 4.2 "Architectural Reference Model" incorporated herein by reference.

The functional entities are presented and explained in detail in TS 23.303 subclause 4.4 "Functional Entities" incorporated herein by reference. The ProSe function is the logical function that is used for network-related actions required for ProSe and plays different roles for each of the features of ProSe. The ProSe function is part of the 3GPP's EPC and provides all relevant network services like authorization, authentication, data handling etc. related to proximity services. For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with the necessary parameters to use ProSe Direct Discovery and ProSe Direct Communication.

The term "UE" used in said connection refers to a ProSe-enabled UE supporting ProSe functionality, such as:
 Exchange of ProSe control information between ProSe-enabled UE and the ProSe Function over PC3 reference point.
 Procedures for open ProSe Direct Discovery of other ProSe-enabled UEs over PC5 reference point.
 Procedures for one-to-many ProSe Direct Communication over PC5 reference point.
 Procedures to act as a ProSe UE-to-Network Relay. The Remote UE communicates with the ProSe UE-to-Network Relay over PC5 reference point. The ProSe UE-to-Network Relay uses layer-3 packet forwarding.
 Exchange of control information between ProSe UEs over PC5 reference point, e.g., for UE-to-Network Relay detection and ProSe Direct Discovery.
 Exchange of ProSe control information between another ProSe-enabled UE and the ProSe Function over PC3 reference point. In the ProSe UE-to-Network Relay case the Remote UE will send this control information over PC5 user plane to be relayed over the LTE-Uu interface towards the ProSe Function.
 Configuration of parameters (e.g., including IP addresses, ProSe Layer-2 Group IDs, Group security material, radio resource parameters). These parameters can be pre-configured in the UE, or, if in coverage, provisioned by signaling over the PC3 reference point to the ProSe Function in the network.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via the PC2 reference point.

Vehicular Communication—V2X Services

A new study item has been set up in the 3GPP in Rel. 14 to consider the usefulness of new LTE features to the automotive industry—including Proximity Service (ProSe) and LTE-based broadcast services. The ProSe functionality explained above is thus considered as offering a good foundation for the V2X services. Changes to the D2D framework are discussed with regard to how the transmission of vehicular communication can be enhanced. For instance, T-RPT patterns might not be used any more. Furthermore, instead of or in addition to using TDD as discussed before for the transmission of data and SA, frequency division multiplexing may be foreseen. Cooperative services in vehicular scenarios are becoming essential for future connected vehicles within the ITS (Intelligent Transportation Systems) research field. They are supposed to decrease road fatalities, improve the capacity of roads, diminish the carbon footprint of road transport and enhance the user experience during travels.

V2X communication is the passing of information from a vehicle to any entity that may affect the vehicle, and vice versa. This information exchange can be used to improve safety, mobility and environmental applications to include driver assistance vehicle safety, speed adaptation and warning, emergency response, travel information, navigation, traffic operations, commercial fleet planning and payment transactions.

LTE support for V2X services contains 3 types of different use cases which are the following:

V2V: covering LTE-based communication between vehicles.

V2P: covering LTE-based communication between a vehicle and a device carried by an individual (e.g., handheld terminal carried by a pedestrian, cyclist, driver or passenger).

V2I: covering LTE-based communication between a vehicle and a road side unit.

These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

With regard to V2V communication, E-UTRAN allows such (vehicle) UEs that are in proximity of each other to exchange V2V-related information using E-UTRA(N) when permission, authorization and proximity criteria are fulfilled. The proximity criteria can be configured by the MNO (Mobile Network Operator). However, UEs supporting V2V Service can exchange such information when served by or not served by E-UTRAN which supports V2X Service.

The device (vehicle UE) supporting V2V applications transmits application layer information (e.g., about its location, dynamics, and attributes as part of the V2V Service). The V2V payload must be flexible in order to accommodate different information contents, and the information can be transmitted periodically according to a configuration provided by the MNO.

V2V is predominantly broadcast-based; V2V includes the exchange of V2V-related application information between distinct devices directly and/or, due to the limited direct communication range of V2V, the exchange of V2V-related application information between distinct devices via infrastructure supporting V2X Service, e.g., RSU, application server, etc.

With regard to V2I communication, the device supporting V2I applications sends application layer information to the Road Side Unit, which in turn can send application layer information to a group of devices or a device supporting V2I applications.

V2N (Vehicle to Network, eNB/CN) is also introduced where one party is a UE and the other party is a serving entity, both supporting V2N applications and communicating with each other via LTE network.

With regard to V2P communication, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P Service can exchange such information even when not served by E-UTRAN which supports V2X Service.

The UE supporting V2P applications transmits application layer information. Such information can be broadcast by a vehicle with UE supporting V2X Service (e.g., warning to pedestrian), and/or by a pedestrian with UE supporting V2X Service (e.g., warning to vehicle).

V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X Service, e.g., RSU, application server, etc.

For this new study item V2X, 3GPP has provided particular terms and definition in TR 21.905, current version 13.0.0, which can be reused for this application.

Road Side Unit (RSU): An entity supporting V2I Service that can transmit to, and receive from a UE using V2I application. An RSU can be implemented in an eNB or a stationary UE.

V2I Service: A type of V2X Service, where one party is a UE and the other party is an RSU both using V2I application.

V2N Service: A type of V2X Service, where one party is a UE and the other party is a serving entity, both using V2N applications and communicating with each other via LTE network entities.

V2P Service: A type of V2X Service, where both parties of the communication are UEs using V2P application.

V2V Service: A type of V2X Service, where both parties of the communication are UEs using V2V application.

V2X Service: A type of communication service that involves a transmitting or receiving UE using V2V application via 3GPP transport. Based on the other party involved in the communication, it can be further divided into V2V Service, V2I Service, V2P Service, and V2N Service.

Many ITS services have common communication requirements:

Periodic status exchange. ITS services typically need to know about the status of vehicle or roadside terminals. This implies the periodic exchange of data packets with information about location, speed, identifier, etc.

Asynchronous notifications. This kind of messages is used to inform about a specific service event. In contrast to the previous status messages, the reliable delivery of these messages to a single terminal or a group of them is usually a key requirement.

Examples of the usage of the first communication type can be found on traffic efficiency services such as remote vehicle monitoring, which gathers periodic status data from vehicles, or safety services such as cooperative collision avoidance, which requires kinematic information about surrounding vehicles to detect potential impacts. Asynchronous notifications are mainly found in safety services, such as slippery pavement or post-collision warning.

Different types of messages are and will be defined for the V2V communication. Two different types of messages have been already defined by ETSI for the Intelligent Transport Systems (ITS), see corresponding European Standards ETSI EN 302 637-2 v1.3.1 and ETSI EN 302 637-3 v 1.2.1:

Cooperative Awareness Messages (CAM), which are continuously triggered by vehicle dynamics to reflect the vehicle status.

Decentralized Environmental Notification Messages (DENM), which are triggered only when vehicle-related safety events occur.

As the V2V and ITS standardizations are rather at the beginning, it is to be expected that other messages might be defined in the future.

CAMs are continuously (periodically) broadcast by ITS-Stations (ITS-S) to exchange status information with other ITS-Ss, and thus have a larger impact on the traffic load than event-triggered (aperiodic) DENM messages. Essentially CAM messages are a kind of heartbeat messages periodically broadcasted by each vehicle to its neighbors to provide information of presence, position, temperature, and basic status. On the contrary, DENMs are event-triggered messages broadcasted to alert road users of a hazardous event. For this reason, traffic characteristics of CAM messages as defined by ETSI for ITS are considered more representative of V2V traffic.

Cooperative Awareness Messages (CAMs) are messages exchanged in the ITS network between ITS-Ss to create and maintain awareness of each other and to support cooperative performance of vehicles using the road network. Point to multipoint communication shall be used for transmitting CAMs, such that the CAMs are transmitted from the originating ITS-S to the receiving ITS-Ss located in the direct communication range of the originating ITS-S. CAM generation shall be triggered and managed by the Cooperative Awareness basic service, which defines the time interval between two consecutive CAM generations. At present, the upper and lower limits of the transmission interval are 100 ms (i.e., CAM generation rate of 10 Hz) and 1000 ms (i.e., CAM generation rate of 1 Hz). The underlying philosophy of ETSI ITS is to send CAMs when there is new information to share (e.g., new position, new acceleration or new heading values). Correspondingly, when the vehicles are moving slowly and on constant heading and speed, a high CAM generation rate brings no real benefit because the CAMs only display minimal differences. The transmission frequency of CAMs of one vehicle varies between 1 HZ to 10 Hz as a function of the vehicle dynamics (e.g., speed, acceleration, and heading). For instance, the slower the vehicle drives, the less number of CAMs are triggered and transmitted. Vehicle speed is the main impacting factor on CAM traffic generation.

In the above, the periodic Cooperative Awareness messages have been described. However, it should be noted that although some of the above information has already been standardized, other information, such as the periodicities and the message sizes, are not standardized yet and are based on assumptions. Furthermore, the standardization might change in the future and thus might also change aspects of how the CAMs are generated and transmitted.

In order for the vehicular UE to have radio resources on the sidelink to transmit the CAMs, Mode1 and/or Mode2 radio resource allocation are envisioned as explained above. For Mode 1 radio resource allocation, the eNB allocates resources for the SA message and data for each SA period. However, when there is a lot of traffic (e.g., high-frequency periodic traffic), the overhead on the Uu link from UE to the eNB could be big.

As apparent from the above, a lot of V2V traffic is periodical, such that the 3GPP has agreed that for sidelink V2V communication Mode 1 (i.e., eNB scheduled radio resource allocation), sidelink semi-persistent radio resource allocation will be supported by eNBs and UEs.

It was agreed to support a sensing mechanism together with semi-persistent transmissions for assisting the autonomous resource control/selection mechanism for the V2X sidelink. The UE would indicate within the PSCCH (SA/SCI) that it has data on a selected set of periodically occurring resources until a resource selection occurs. This resource reservation information (signaled within the SCI) can be used by other UEs which are intending to transmit a V2X message for the selection of a resource such that resources that are already reserved/booked by other UEs are not considered for radio resource selection. This resource reservation/booking procedure is particularly suitable for traffic for which packets arrive with a certain periodicity, e.g., CAM messages.

The indication of reserved radio resources in the scheduling information as mentioned above can be monitored ("sensed") by other (vehicular) devices. In general, the sensing procedure collects information on radio resources and thus allows predictions on future radio resources which can be used in the resource allocation procedure to identify a set of resource candidates for transmission. Very few things have been already agreed by 3GPP, but it may be assumed that the sensing process categorizes time frequency resources into:

'Unavailable' resources. These are the resources on which the UE is not allowed to transmit since those resources are already booked/reserved by other UEs, and 'candidate (or available) resources'. These are the resources on which the UE may/can perform a transmission.

Furthermore, 3GPP agreed to also perform energy measurement for the sensing procedure, although the agreement did not provide for any details about how and what energy measurements are to be performed. Energy-based sensing can be understood as a process where UE measures received signal strength on PSSCH radio resources and/or PSCCH radio resources. Energy-based sensing essentially may be helpful to identify near versus far interferers.

Furthermore, it was discussed whether the priority of the data (or corresponding radio resource reservation) is indicated in the scheduling assignment (SCI) such that it may be used in the resource allocation procedure, although it was not agreed how the priority is effectively used.

A further topic coming up during discussion was to use the congestion level of the channel (i.e., of the PC5 interface) for the resource allocation procedure, which could be similar to a Channel Busy Rate (CBR) already known from the ETSI standards (see e.g., ETSI EN 302 571 v 2.0.0 and 102 687 v1.1.1.). Again, no details were discussed in said respect, let alone agreements on how to exactly use such a congestion level.

As explained above in connection with FIGS. 6 and 7, so as to increase the reliability of the transmissions, each transport block and scheduling assignment is transmitted over the sidelink with repetitions, i.e., the initial transmission of a scheduling assignment or data is repeated one or more times. The ongoing discussions in 3GPP have not distinguished between initial and repeated transmissions of data/SA, and it remains unclear how the semi-persistent scheduling and resource sensing for V2X transmissions are to be implemented in said respect.

Sensing and semi-persistent scheduling should be implementable in a simple way in order not to increase the complexity of the UE too much. Although general agreements were reached as regards sensing and resource reservation for V2X transmissions over the PC5 interface, implementing these mechanisms into current systems might cause problems and inefficiencies.

BRIEF SUMMARY

Non-limiting and exemplary embodiments provide an improved transmission procedure for a transmitting device for performing initial transmissions and retransmissions for data via a sidelink interface. The independent claims provide non-limiting and exemplary embodiments. Advantageous embodiments are subject to the dependent claims.

According to a first aspect, a transmitting device is provided for performing initial data transmissions and data retransmissions via the sidelink interface to other devices. It is assumed that a resource sensing procedure is continuously performed by the transmitting device so as to acquire information about future radio resources. According to one example, the radio resource sensing at least comprises monitoring scheduling assignments transmitted by other devices that reserve radio resources at a later point(s) in time., which can then be excluded from the radio resource selection. Sensing may optionally also comprise measuring the received signal energy in the radio resources. In the future, other information might be collected as well during the sensing.

According to the first aspect, one data transmission (e.g., the initial transmission) is "prioritized" over the remaining (re)transmissions, in that the vehicular UE performs the resource allocation procedure to select radio resources for that one data transmission based on the information acquired from the radio sensing procedure in a sensing window before the data became available for transmission. Consequently, the radio resources selected for this (initial) transmission should not cause a collision with transmissions from other UEs and thus should be transmitted with a high reliability. On the other hand, radio resources to be used for the remaining data (re)transmissions are less flexibly selected so as to be able to reduce the signaling overhead. In particular, for the remaining data (re)transmissions, the vehicular UE shall select a suitable data transmission timing pattern (also termed in the following T-RPT) which defines the timing of one or more data transmissions, and is used by the vehicular UE with the first data transmission as a reference to perform the remaining data (re)transmissions. Scheduling information transmitted by the vehicular UE for the data transmission correspondingly indicates the time frequency resources for the initial transmission as well as the data transmission timing pattern from which the receiving entities derive the transmission timing used by the vehicular UE for the first and all the retransmissions. As regards the frequency resources, data retransmissions performed by the vehicular UE may either use the same frequencies used for the initial data transmission or use frequencies derived from the initially used frequencies based on a frequency hopping pattern; in the latter variant, the scheduling information additionally shall indicate whether or not hopping is to be used to determine the frequencies used for the data retransmissions.

According to one variant, the selected data transmission timing pattern will already identify all the transmissions or retransmissions to be performed for the data. Correspondingly, the (re)transmissions will be completed within the time period given by the data transmission timing pattern; e.g., within 8 subframes in case of an 8-bit data transmission timing pattern.

According to further variants of the first aspect, the selected data transmission timing pattern will only indicate a single transmission, wherein this one-transmission data transmission timing pattern will be repeated throughout the transmission window after the first data transmission. By sequentially positioning the selected one-transmission data transmission timing pattern, various data retransmission candidates are defined at those positions of the repeated timing patterns that indicate the transmission. The vehicular UE will have to select among the various data retransmission candidates those candidates that will be indeed used for the retransmission of the data. The selection of the one-transmission T-RPT can be performed by the vehicular UE using the information acquired by the resource sensing procedure, such that the resulting data transmission candidates, and particularly the data retransmission candidates selected later to be actually used, are optimal from the viewpoint of collision rate and interference.

The selection of the data retransmission candidates may be performed randomly or may be based on the results of the sensing procedure in said respect so as to improve the transmission reliability and to avoid collisions with transmissions of other UEs. Which of the data retransmission candidates is actually used by the vehicular UE will then have to be indicated to the receiving entities, e.g., as part of the scheduling information transmitted by the vehicular UE for the data transmission. As regards the frequency resources, the data retransmissions performed according to the selected data retransmission candidates can use either the frequencies already employed by the vehicular UE for the initial data transmission or can follow a frequency hopping pattern starting from the frequencies used for the initial data transmission.

According to a further variant of the first aspect, the selection of the one-transmission T-RPT is based on the sensing results of the resource sensing procedure as follows. The vehicular UE first determines a preferred data retransmission candidate (e.g., the second-highest ranked possible data retransmission candidate) throughout the transmission window (after the first data transmission), which is then used to determine the one-transmission T-RPT that, when repeated throughout the transmission window, has the "1" coincide with that preferred data retransmission candidate. Consequently, the frequency and time domain resources for the initial transmission as well as for one data retransmission (i.e., the preferred data transmission candidate) are freely determined by the vehicular UE based on the sensing results, thereby increasing the reliability of the data transmission and reducing the collision rate. For this variant, the scheduling information shall not only indicate the time frequency radio resources for the initial data transmission but also shall separately indicate the frequency resources for this preferred data retransmission. This can be done for instance by providing a frequency offset with regard to the frequency indication provided for the initial data transmission. As before, the T-RPT is indicated in the scheduling assignment so as to provide the transmission timing of all the retransmissions, using the initial data transmission as the reference.

According to a further aspect, radio resources available for the vehicular UE for data transmissions in general, shall be divided into radio resources to be used for initial data transmissions and radio resources to be used for data retransmissions. Separating the radio resources will make sure that retransmissions and initial transmissions of data will not collide, thereby protecting the initial transmission which is the most important one.

Correspondingly, in one general first aspect, the techniques disclosed here feature a transmitting device for transmitting data via a sidelink interface to one or more receiving devices. The transmission of the data comprises a first transmission of the data and, after the first data transmission, one or more retransmissions of the data. A receiver and a processor of the transmitting device perform a resource sensing procedure so as to acquire information about radio resources usable for the transmitting device to transmit data at a later point in time. The processor, after data becomes available for transmission, performs an autonomous radio resource allocation to select time-frequency radio resources within a transmission window to be used for performing a first transmission of the data, based on the information acquired by the resource sensing procedure during a sensing window before the data became available for transmission. The processor determines a data transmission timing pattern among a plurality of data transmission timing patterns, each data transmission timing pattern indicating a transmission timing for performing one or more transmissions of data. A transmitter of the transmitting device performs the first data transmission using the selected time-frequency radio resources and performs the one or more data retransmissions at the transmission timing defined by the determined data transmission timing pattern with respect to the first data transmission.

Correspondingly, in one general first aspect, the techniques disclosed here feature a method for a transmitting device for transmitting data via a sidelink interface to one or more receiving devices. The transmission of the data comprises a first transmission of the data and, after the first data transmission, one or more retransmissions of the data. The method comprises the following steps performed by the transmitting device. A resource sensing procedure is performed so as to acquire information about radio resources usable for the transmitting device to transmit data at a later point in time. After data becomes available for transmission, an autonomous radio resource allocation is performed to select time-frequency radio resources within a transmission window to be used for performing a first transmission of the data, based on the information acquired by the resource sensing procedure during a sensing window before the data became available for transmission. The transmitting device determines a data transmission timing pattern among a plurality of data transmission timing patterns, each data transmission timing pattern indicating a transmission timing for performing one or more transmissions of data. The transmitting device performs the first data transmission using the selected time-frequency radio resources and performs the one or more data retransmissions at the transmission timing defined by the determined data transmission timing pattern with respect to the first data transmission.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE DRAWINGS

In the following exemplary embodiments are described in more detail with reference to the attached figures and drawings.

FIG. 16 illustrates a sequence of subframes for a transmission window and the initial data transmission and data retransmissions according to a further improved implementation of the first embodiment.

DETAILED DESCRIPTION

Figure 1:
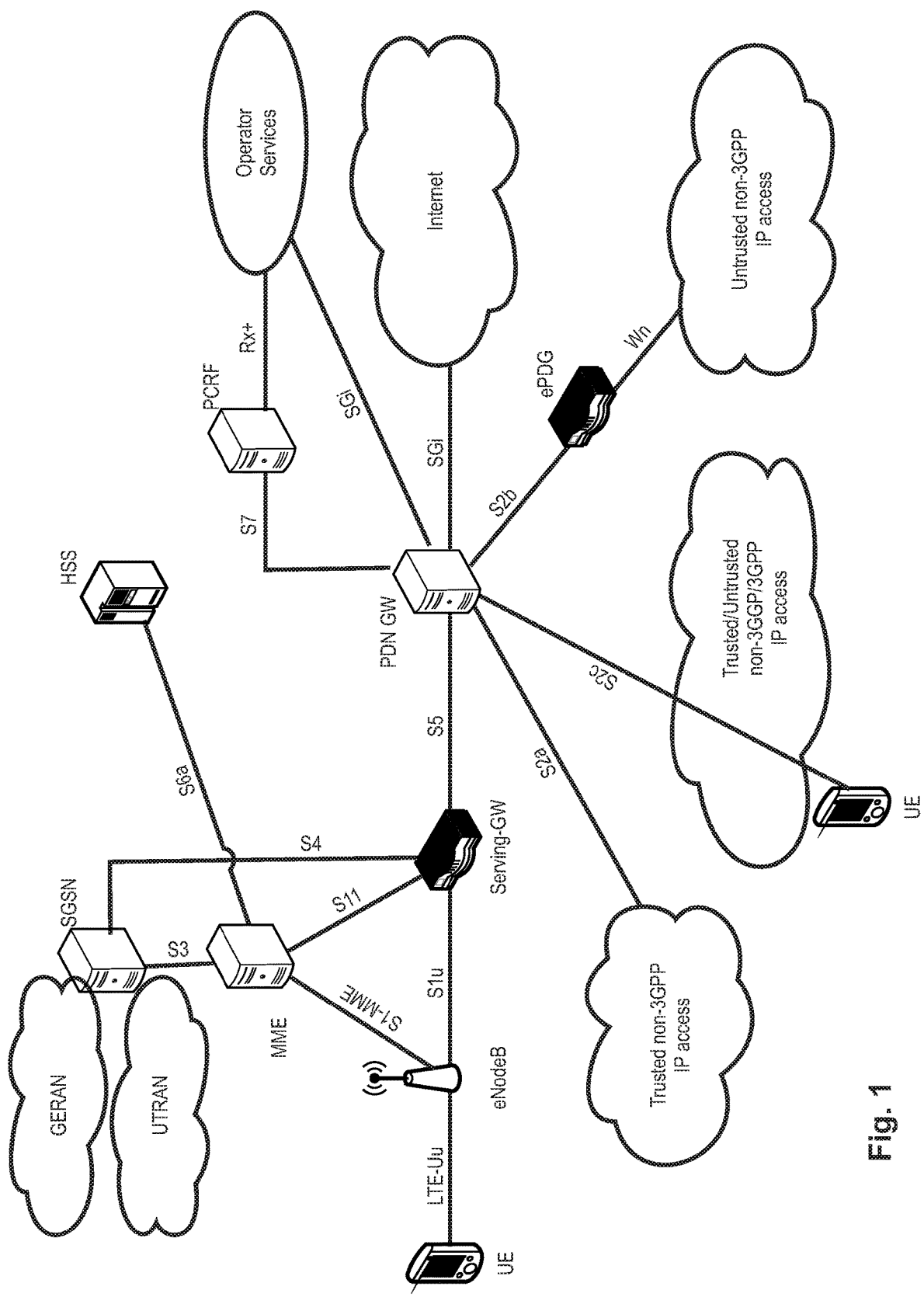
FIG. 1 shows an exemplary architecture of a 3GPP LTE system.
Figure 2:
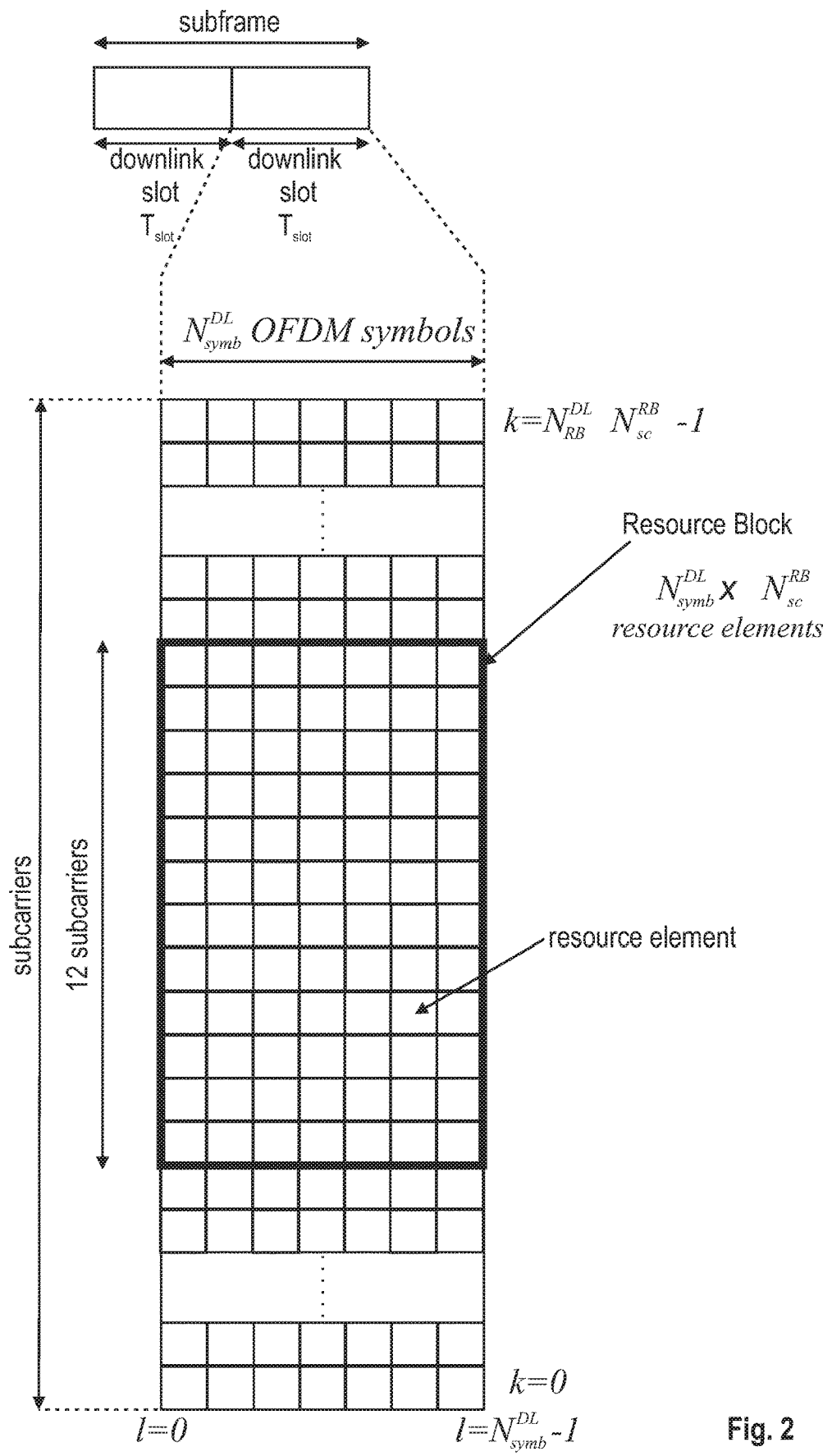
FIG. 2 shows an exemplary downlink resource grid of a downlink slot of a subframe as defined for 3GPP LTE (Release 8/9), FIG. 3 schematically illustrates how to establish a layer-2 link over the PC5 for ProSe communication.
Figure 3:
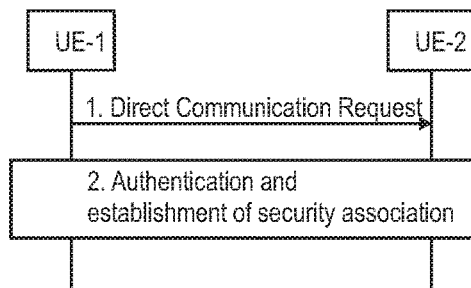
Figure 4:
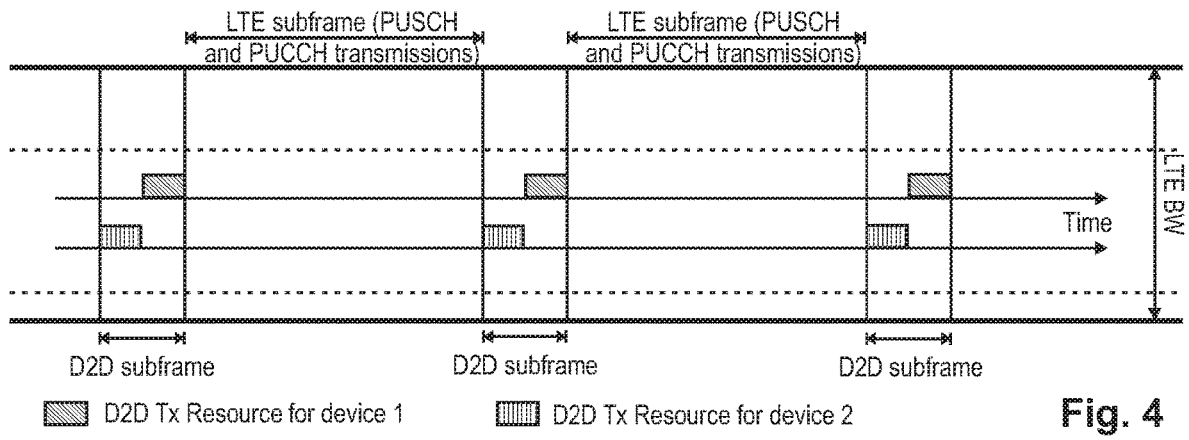
FIG. 4 illustrates the use of transmission/reception resources for overlay (LTE) and underlay (D2D) systems.
Figure 5:
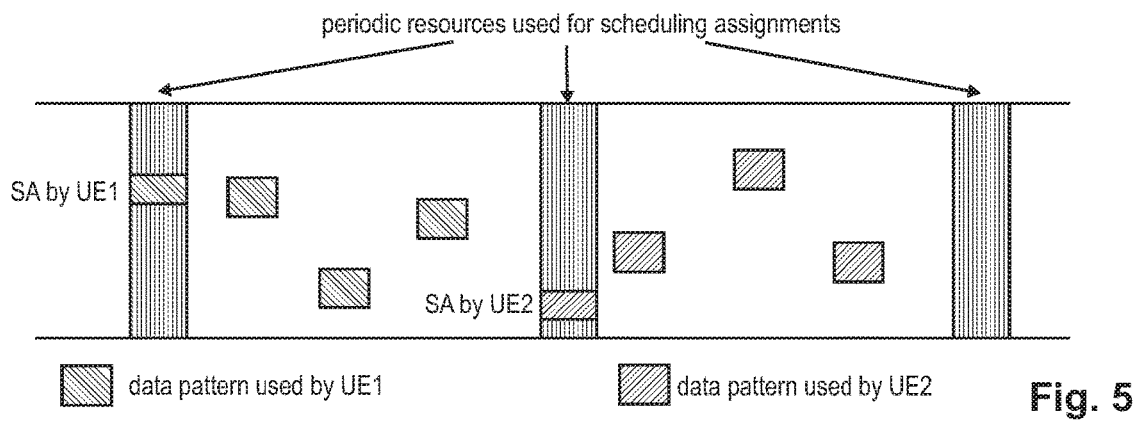
FIG. 5 illustrates the transmission of the Scheduling Assignment and the D2D data for two UEs.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "direct communication transmission" as used in the application is to be broadly understood as a transmission directly between two user equipments, i.e., not via the radio base station (e.g., eNB). Correspondingly, the direct communication transmission is performed over a "direct sidelink connection", which is the term used for a connection established directly between two user equipments. For example, in 3GPP the terminology of D2D (Device-to-Device) communication is used or ProSe communication, or a sidelink communication. The term "direct sidelink connection", "sidelink interface" is to be broadly understood and can be understood in the 3GPP context as the PC5 interface described in the background section.

The term "ProSe" or in its unabbreviated form, "Proximity Services", used in the application is applied in the context of Proximity-based applications and services in the LTE system as exemplarily explained in the background section. Other terminology such as "D2D" is also used in this context to refer to the Device-to-Device communication for the Proximity Services.

The term "vehicular mobile terminal" as used throughout the application is to be understood in the context of the new 3GPP study item respectively work item V2X (vehicular communication) as explained in the background section. Correspondingly, a vehicular mobile terminal shall be broadly understood as a mobile terminal which is specifically installed in a vehicle (e.g., car, commercial trucks, motorcycles etc) to perform vehicular communication, i.e., passing information related to the vehicle to other entities (such as vehicles, infrastructure, pedestrians) e.g., for the purpose of safety or driver assistance. Optionally, the vehicular mobile terminal may have access to information available at the navigation system (provided it is also installed in the car), such as map information etc.

The terms "autonomous radio resource allocation" (conversely "radio base station controlled radio resource allocation") as used throughout the application may exemplarily be understood in the context of 3GPP Proximity Services allowing two modes for the resource allocation; namely Mode 1 (i.e., the radio base station controlled radio resource allocation) according to which the radio base station controls the allocation, and Mode 2 (i.e., autonomous radio resource allocation) according to which the terminal (or transmitting device) autonomously selects the resources (without the radio base station).

The term "data transmission timing pattern" as used throughout the application may exemplarily be understood as information defining the timing of transmissions, for instance a T-RPT (time resource pattern of transmission) as known in the context of 3GPP D2D technology. Depending on the actual implementation, the data transmission timing pattern may be used to indicate a first data transmission as well as the retransmissions of the data, or is only used to indicate the retransmissions of the data while the first data transmission is indicated separately.

As explained in the background section, 3GPP has introduced a new study item for LTE-assisted vehicular communication, which shall be based on ProSe procedures to exchange V2X traffic between the various vehicular mobile terminals and other stations. Furthermore, a kind of semi-persistent radio resource allocation shall be supported for V2X traffic, and it has been agreed that mechanisms for radio resource reservation as well as sensing will be supported to said end—in particular for the UE-autonomous resource allocation mode (also referred to as Mode 2). However, only general agreements have been reached with respect to sensing and radio resource reservation, without providing details on how to implement same and how to adapt other mechanisms so as to ensure efficient and flawless operation. For instance, it remains unclear how exactly the resource sensing mechanism and radio resource reservation shall be implemented.

Figure 9:
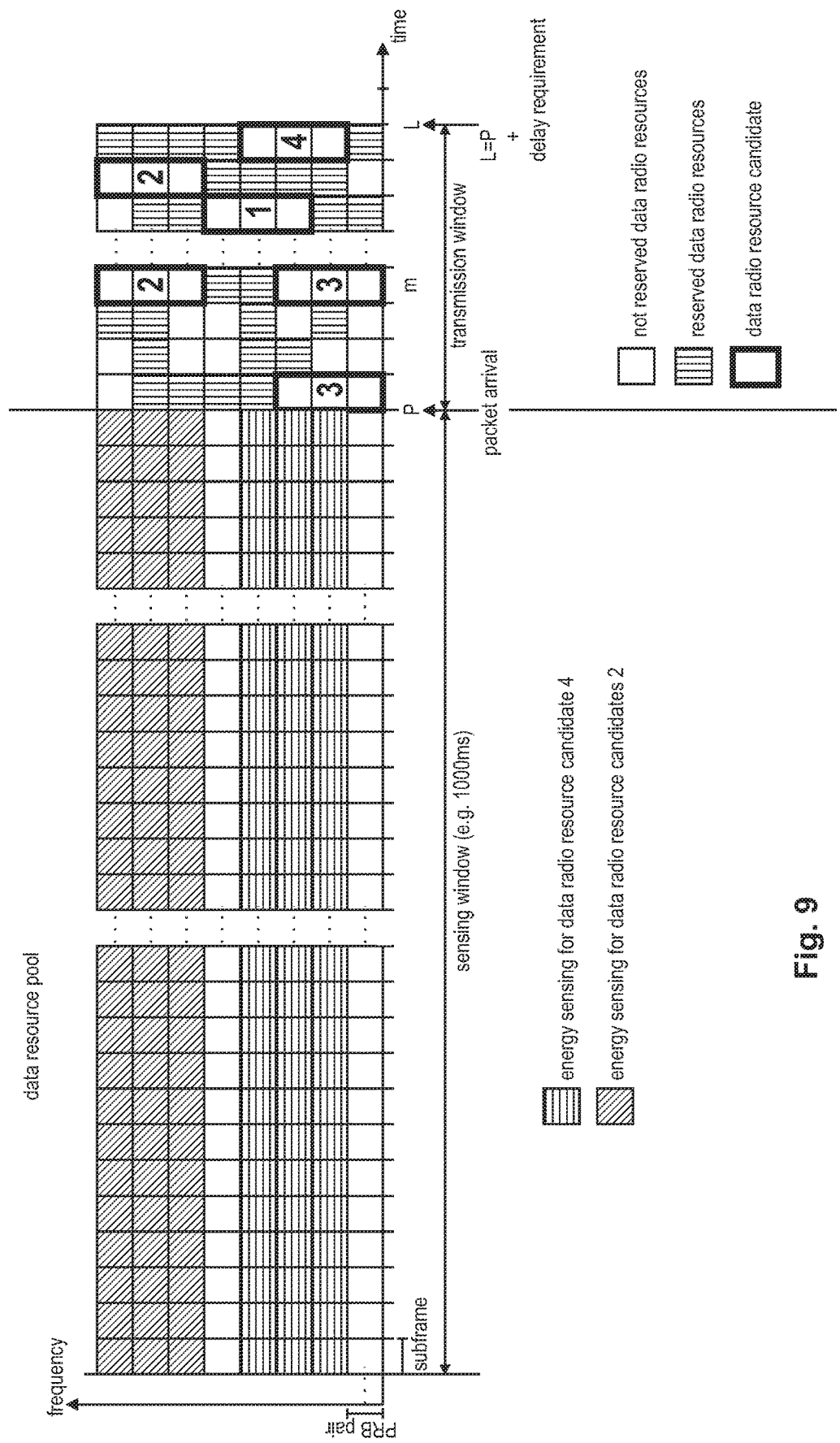
FIG. 9 illustrates frequency-time radio resources of a data resource pool for a vehicular UE divided at a time P where data becomes available for transmittal, into a transmission window and a sensing window.

One possible solution will be explained in the following with reference to FIG. 9, which illustrates in an exemplary and simplified manner frequency-time radio resources of a data resource pool of a vehicular UE (transmitting device in general). A PRB pair (Physical Resource Block pair; 12 subcarriers for one subframe) is taken as unit for exemplarily illustrating the frequency-time radio resources in the figure. It is assumed that at a time P data becomes available for transmission (i.e., a packet arrival), and the transmission of the data (as well the retransmissions of the data) should be finished at time L; the time period can be denoted as the transmission window and is dependent on the delay requirement(s) of the data that is to be transmitted (e.g., 100 ms; L=P+100 ms). The results of the sensing procedure obtained within a sensing window of e.g., 1000 ms before the packet arrival shall be considered for the radio resource allocation procedure to be performed by the vehicular UE to select the frequency-time radio resources (and possibly other transmission parameters) for transmitting the data. It is exemplarily assumed that three (physical) resource block pairs are needed for the transmission of the data (further, according to the current standardization, the resource blocks should be contiguous).

One information obtained from the sensing procedure is that particular radio resources in the transmission window are already reserved by other devices and should thus not be used by the vehicular UE; the corresponding boxes for reserved radio resources are striped vertically. The radio resource candidates (each three contiguous resource block pairs) in the complete transmission window that are available for the vehicular UE to transmit the data are illustrated as framed in FIG. 9. There are six candidates in total in the transmission window, all of which may be ranked according to one or more specific characteristics. As one example, the ranking procedure may rank the various radio resource candidates based on the energy measurements performed during the sensing procedure in the sensing window. In more detail, it is possible to measure the energy (e.g., received signal strength) across the whole sensing window for related radio resource candidates. It is exemplarily assumed that the corresponding radio resource candidates are ranked from 1 to 4 as illustrated in FIG. 9 based on the energy measurements. Correspondingly, radio resource candidates 2, having the same corresponding frequency radio resources in the sensing window are ranked equally. The same applies to the two resource candidates 3. FIG. 9 illustrates in diagonal stripes the corresponding radio resources of the sensing window, which measured energy is averaged to predict the energy for radio resource candidates 2. Similarly, FIG. 9 illustrates the corresponding frequency time radio resources in the sensing window used for the energy measurement for resource candidate 4 as being striped horizontally. Although not illustrated in FIG. 9 for ease of illustration, corresponding energy measurements and processing are performed for radio resources in the sensing window corresponding to candidates 1 and 3 as well.

It is exemplarily assumed that the vehicular UE performs for a single transport block four transmissions, i.e., a first transmission as well as three retransmissions. One possible implementation would be to use the results of the resource sensing procedure for each transmission of the data, i.e., for the first as well as for the retransmissions of the data. In the above presented example of FIG. 9, the vehicular UE could thus select the four highest-ranked resource candidates for transmitting the four (re)transmissions. This solution is flexible and efficiently uses for the transmission of the data (i.e., one transport block) the best available radio resources in the time domain as well as in the frequency domain.

Figure 6:
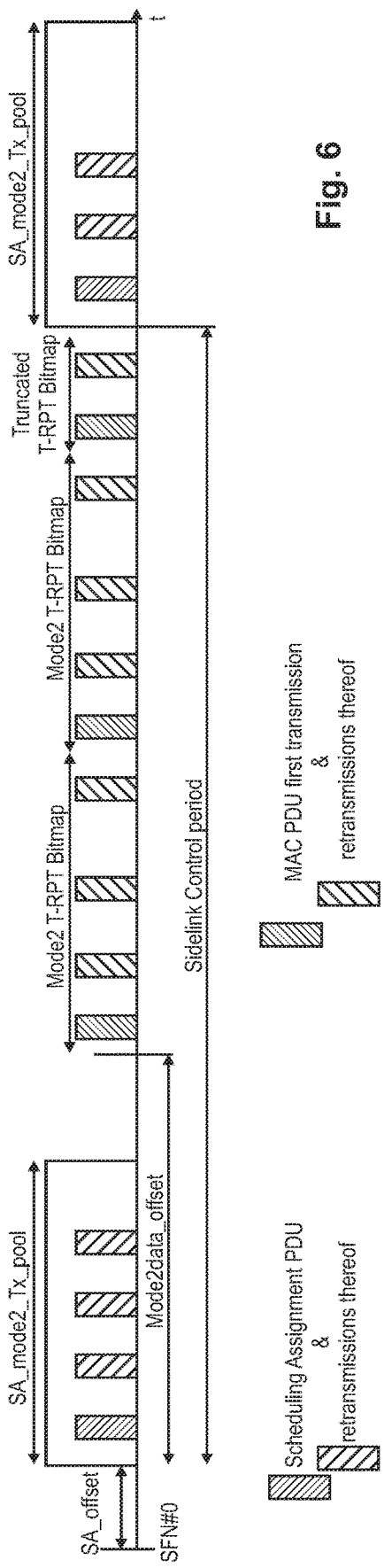
FIG. 6 illustrates the D2D communication timing for the UE-autonomous scheduling Mode 2.
Figure 7:
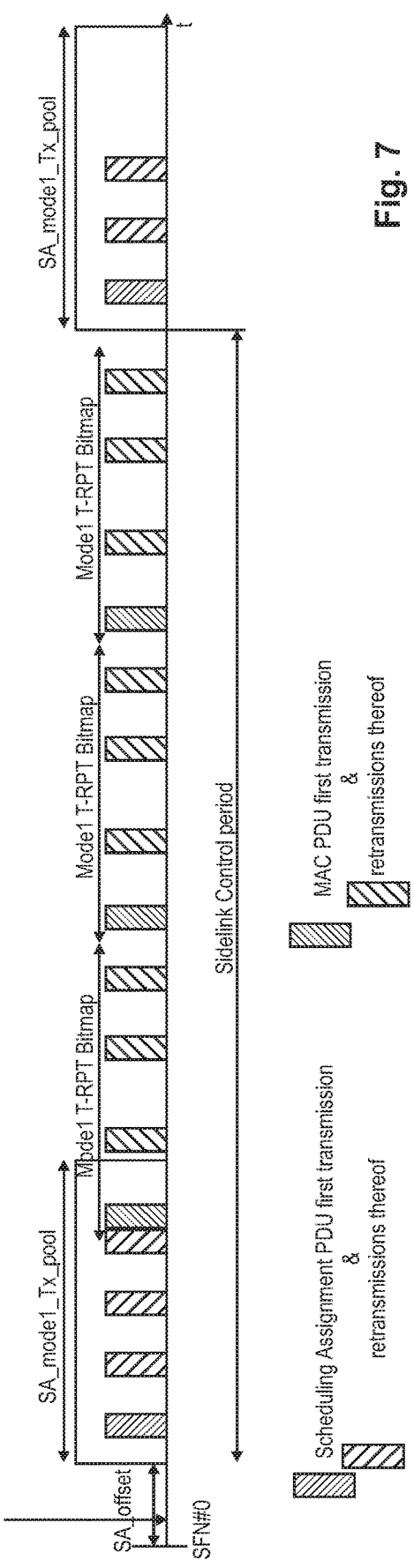
FIG. 7 illustrates the D2D communication timing for the eNB-scheduled scheduling Mode 1.
Figure 8:
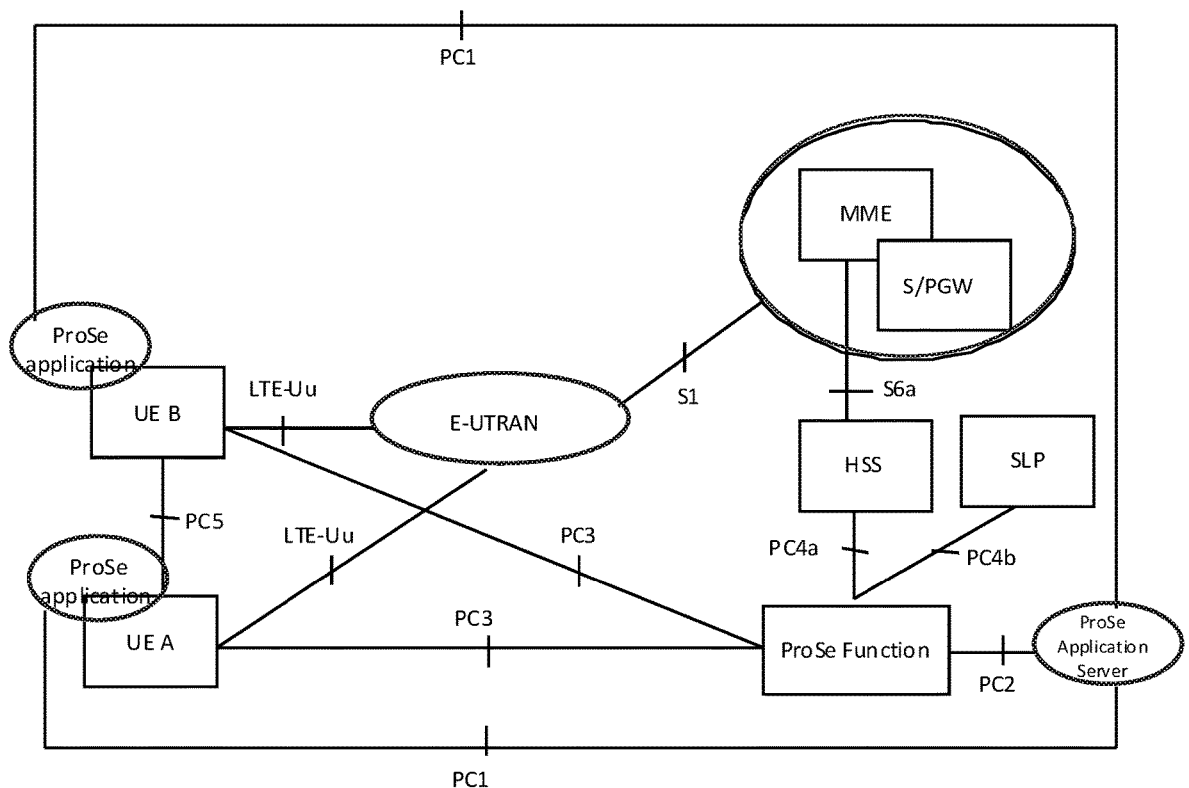
FIG. 8 illustrates an exemplary architecture model for ProSe for a non-roaming scenario.

However, in order to indicate the radio resources (i.e., time and frequency within the transmission window) used for each (re)transmission for the receiving entities, a scheduling assignment could be transmitted for each (re)transmission. Alternatively, one scheduling assignment could be transmitted which includes all the necessary information for the receiving entities to be able to receive and properly decode the first and all retransmissions. In any case, this significantly increases the signaling overhead compared to the prior art solution. In the prior art as exemplified in FIG. 6, one scheduling assignment is transmitted for all the (re)transmissions, indicating the time-frequency resources for all the transmissions, and indicating the corresponding T-RPT pattern, which uniquely defines the timing of all the (re)transmissions. In the prior art, the frequency resources used for the retransmission are either the same as used for the first data transmissions (explicitly indicated in the SA) or follow a frequency hopping pattern starting from the frequency resources used for the first data transmission (the scheduling assignment indicates whether a frequency hopping pattern is used or not). If there is no such fixed time and/or frequency relationship between the first and the retransmissions, separate information on the actually used time-frequency radio resources need to be provided for each transmission to the receiving entities.

Furthermore, the receiving entities need to be able to associate the first and retransmissions of one transport block together, e.g., in order to enable soft-combining of data. In said respect, a bitmap of length L-P (100 bits to be able to indicate transmissions within a 100 ms transmission window) could be signaled indicating the subframes where the transmissions take place, thereby allowing the receiving entities to associate all transmissions of one transport block together. However, the bitmap would be long and thus would additionally increase the signaling overhead. Furthermore, the transmission window can have different lengths, and thus the bitmap must be either very long to be able to indicate the longest possible transmission window, or the size of the bitmap would change depending on the length of the transmission window, wherein any of the two solutions would be disadvantageous.

The above provides a possible solution to implement the sensing procedure and the corresponding radio resource allocation for the first transmission and retransmissions of the same data, although it involves several disadvantages and problems.

The following exemplary embodiments are conceived by the inventors to mitigate the disadvantage(s) and problem(s) explained above.

Particular implementations of the various embodiments are to be implemented in the wide specification as given by the 3GPP standards and explained partly in the background section, with the particular key features being added as explained in the following embodiments. It should be noted that the embodiments may be advantageously used for example in a mobile communication system, such as 3GPP LTE-A (Release 10/11/12/13/14, or later releases) communication systems as described in the Technical Background section above, but the embodiments are not limited to its use in these particular exemplary communication networks.

The explanations should not be understood as limiting the scope of the disclosure, but as mere examples of embodiments to better understand the present disclosure. A skilled person should be aware that the general principles of the present disclosure as laid out in the claims can be applied to different scenarios and in ways that are not explicitly described herein. Several assumptions are made for illustration purposes which however shall not restrict the scope of the following embodiments.

The various embodiments mainly focus on improving how a transmitting device performs the radio resource allocation and transmission of data via a sidelink interface, in said respect also suggesting improvements for the scheduling assignment content transmitted by the device for the data transmission. Details will become apparent from the described embodiments below. Other functionality (i.e., functionality not changed by the various embodiments) may remain exactly the same as explained in the background section or may be changed without any consequences to the various embodiments.

One exemplary scenario to which the various embodiments can be applied is V2X-communication as exemplified in the background section. Consequently, the transmitting and receiving devices can be e.g., a UE in a vehicle, a road side unit, a "normal" mobile terminal carried by a pedestrian etc. Further, the data may be (periodic) vehicular data e.g., CAM messages, which shall be continuously exchanged among the various vehicular entities and for which the resource sensing procedure and semi-persistent resources have been discussed in 3GPP. Although the following exemplary embodiments will be explained for illustration purposes in connection with such a V2X-communication scenario, the disclosure shall not be restricted thereto.

First Embodiment

In the following a first embodiment for solving the above-mentioned problem(s) will be described in detail. Different implementations and variants of the first embodiment will be explained as well.

As already mentioned above, exemplarily, a vehicular UE is assumed which is installed in a vehicle and is capable of performing vehicular communication based on the D2D framework as explained in the background section of this application. Correspondingly, vehicular data (e.g., periodic and aperiodic data) shall be transmitted by the vehicular UE to other entities for which the data is of interest. It is assumed that the UE supports and mainly performs Mode-2 radio resource allocation and has been properly configured with the necessary resource pool(s) (for data and scheduling assignments) to be able to autonomously select radio resources for transmitting the scheduling information as well as the data via the PC5 (sidelink) interface.

The periodic data to be transmitted by the vehicular UE will be exemplified by the Cooperative Awareness Messages (CAMs) explained in detail in the background section. As explained in the background section, sensing and radio resource reservation have been generally approved by 3GPP to be included in future standard release(s) in connection with the transmission of periodic vehicular data. In particular, radio resource reservation at the transmitting side allows implementing a kind of "semi-persistent" radio resource allocation, by e.g., reserving the same resources as currently used also for one or more later time instances to transmit further packets of the periodic data. Consequently, it is not necessary at those later time instances for the vehicular UE to again perform a resource selection/request (Mode-1 or Mode-2 resource allocation) in order to be able to transmit the periodic data. The radio resource reservation can be implemented in different ways and has not been fixed yet by 3GPP. For instance, the radio resource reservation can be done for the next transmission instance or for a longer time period (i.e., for more than just the next transmission instance of the periodic data). The scheduling information (SCI) transmitted together with sidelink data identifies the radio resources that are used for the transmission and thus allows a receiving entity to properly receive and process/decode the sidelink data. The scheduling information may additionally be used to indicate the radio resource reservation, e.g., by indicating a time or periodicity of the data such that the receiving entity can determine for which time (e.g., subframe) the radio resources are reserved.

The vehicular UE shall further continuously perform the radio sensing procedure as explained in the background section so as to acquire information about future radio resources. This information can then be used during a Mode-2 radio resource allocation procedure performed by the vehicular UE to select radio resources (and possibly other transmission parameters) for transmitting the data (optionally the corresponding scheduling assignment too). The sensing procedure includes e.g., decoding the scheduling assignments transmitted by other devices so as to identify reserved radio resources. Optionally, the sensing procedure further comprises energy measurements (e.g., the received signal strength, RSSI) throughout the frequency resources for data transmissions configured for the vehicular UE.

One potential implementation option of the resource sensing procedure is that every UE has a map with a prediction of frequency resources that spans over e.g., 100 ms (with e.g., a maximum of 1 second), starting from the next subframe. Then, at a time P when a packet arrives at the buffer in the UE, the UE already has prepared a map of all frequency resources for subframes P to L (may be termed a transmission window), where L basically corresponds to the maximum time span (according to QoS) until the packet should be transmitted. The frequency map may distinguish between unavailable and available radio resources (and possibly also comprises information as to the predicted energy level of the different radio resources). Other implementations of the radio sensing procedure are equally possible, e.g., where the UE does not continuously update such a future resource map, but rather predicts the radio resources from past measurements in the sensing window only when needed.

The transmission of the data includes a first transmission of the data, as well as one or more retransmissions of the data. For instance, it is mainly assumed in the following that the number of total transmissions is four, or put differently that three retransmissions are performed in addition to the initial transmission of the data. The number of total transmissions for data can be predetermined (e.g., by the standard or a network operator) or can be configurable (e.g., by an eNodeB controlling the vehicular UE, or by the vehicular UE itself). In case the number of total transmissions is configurable, the recipients of the data must somehow know the number of total transmissions they should expect. This could be ensured for instance by providing corresponding information in the scheduling assignment or by broadcasting information by the eNodeB in the cell.

One exemplary implementation involves the use of incremental redundancy as already known from 3GPP. In particular, in HARQ operation the eNB can transmit different coded versions from the original transport block (i.e., the data to be transmitted) in retransmissions so that the UE can employ incremental-redundancy-(IR)-combining to get additional coding gain via the combining gain. Similarly, it is possible for the V2X transmissions over the sidelink interface to use incremental redundancy for the retransmissions such that different redundancy versions of the same data are transmitted, e.g., following a predetermined redundancy version sequence (such as 0, 2, 3, 1, as already defined for the HARQ synchronous non-adaptive retransmission). Consequently, when explaining that a first transmission and retransmissions of the same data (e.g., one transport block) is performed, it should not be construed as meaning that it is exactly the same data but the expression should rather also cover cases where different redundancy versions of the same data are transmitted.

In summary, it is assumed that the vehicular UE continuously performs a radio resource sensing procedure to acquire information about future radio resources (be it reservations and/or RSSI predictions, or other information too). The vehicular UE shall be further able to transmit periodic (and non-periodic data) and shall in said connection perform a Mode-2 resource allocation procedure (UE-autonomous) so as to select radio resources within a transmission window to be used for the transmission of the data (may further include the determination of other transmission parameters such as MCS, etc). The information acquired through the resource sensing procedure shall be used in the resource allocation procedure so as to improve same.

Different variants of the first embodiment will be explained in the following. The first embodiment provides an improved transmission procedure for the data transmissions to be performed via the PC5 sidelink interface. The first embodiment prioritizes one of the data transmissions (e.g., the initial data transmission) by fully using the radio resource sensing results for the resource allocation to improve the reliability of the initial transmission. On the other hand, the resource allocation is less flexible for the remaining data (re)transmissions which thus will not benefit from the resource sensing procedure in the same manner as the initial transmission but which allows reducing the signaling overhead. When using incremental redundancy, the first transmission is the most important one, since it is the first transmission received by the receiving entity and since it is self decodable which might not be the case for other redundancy versions.

When data becomes available for transmission, the vehicular UE shall perform the UE-autonomous radio resource allocation procedure in order to obtain the necessary transmission parameters, including the selection of time-frequency radio resources within the transmission window so as to perform a first transmission of the pending data. The resource allocation procedure shall take the results obtained by the sensing procedure during a sensing window before the data arrival (see sensing window in FIG. 9) fully into account when determining the radio resources to be used for the initial transmission of the data. For instance, reserved radio resources should be avoided, and a best radio resource candidate can be selected among various candidates that are ranked based on energy measurements performed during the sensing window.

In order to also determine how to perform the retransmissions of the data, the transmitting device shall determine a suitable data transmission timing pattern (such as the T-RPT known from the background section) which defines a timing pattern of one or more data transmissions. The T-RPT is usually a bitmap having a length of several bits (e.g., 8 bits), each bit being associated with a possible transmission timing (e.g., one subframe) of the data. A plurality of T-RPTs can be defined. For instance, the T-RPTs can have different number of transmissions, where an 8-bit T-RPT can indicate up from 1 to 8 transmissions. Furthermore, the positions of the transmission(s) can vary in a T-RPT, where there can be e.g., 8 different T-RPTs indicating a single transmission. How many and which T-RPTs are defined in the transmitting device can be predetermined (e.g., by a standard or network operator) or may be configurable (e.g., by the eNodeB controlling the vehicular UE). According to one example, the T-RPTs already defined for the D2D communication for 3GPP Releases 12 and 13 can be reused. In any case, the vehicular UE shall select a suitable T-RPT so as to determine the timing at which the retransmissions of the data will be performed. The T-RPT, and thus the data transmission(s) indicated thereby, is thus positioned in the transmission window using the first transmission as a reference. For instance, the selected T-RPT may be immediately following the first data transmission, or may include the first data transmission as part of the T-RPT.

Correspondingly, the vehicular UE will perform the first data transmission according to the selected time-frequency radio resources, and then performs the data retransmissions at the transmission timings defined by the selected T-RPT. Furthermore, the retransmissions performed by the vehicular UE can either be using the same frequencies (i.e., PRBs) as already used for the initial transmission, or can use frequencies derived from the frequencies of the initial transmission based on a frequency hopping pattern (as e.g., known from the prior art).

The first embodiment thus provides a solution combining an improved first data transmission which is based on the sensing results, while at the same time using simple transmission patterns to coordinate the data retransmissions with the first transmission as a reference. Correspondingly, the information to be provided to the receiving entities is thus rather limited, and does not cause a high signaling overhead. In particular, the scheduling assignment transmitted by the vehicular UE for the data transmission indicates the time-frequency radio resources for the first transmission as well as the selected T-RPT, such that the receiving entities are able to receive the first data transmission as well as the data retransmissions. Optionally, the scheduling assignment may further include information as to whether a frequency hopping pattern was used for the frequency resources used for the data retransmissions.

Figure 10:
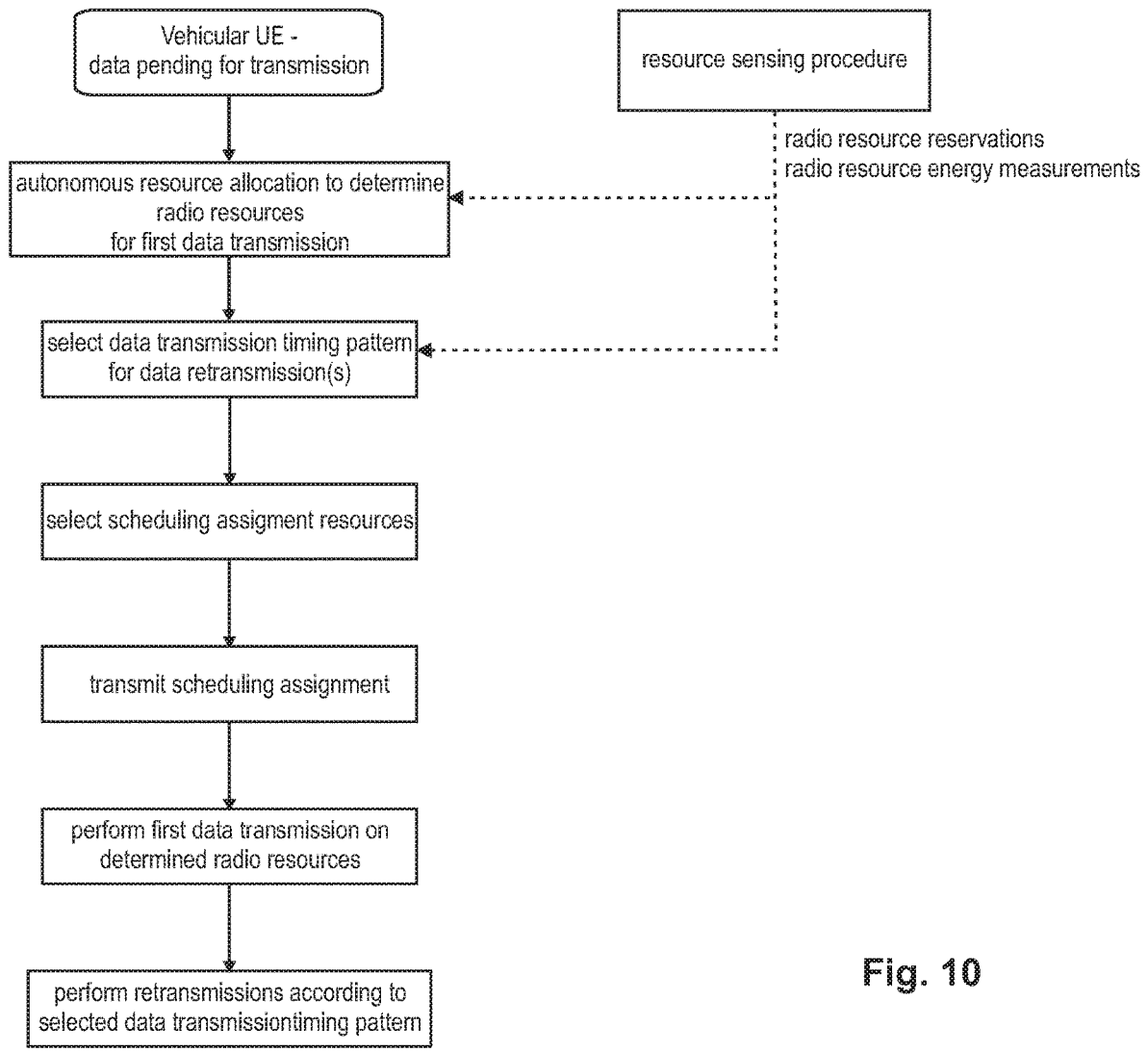
FIG. 10 is a sequence diagram for a UE behavior according to an exemplary implementation of the first embodiment.

FIG. 10 is a sequence diagram for a UE behavior according to an exemplary implementation of the first embodiment, in line with the above explanations. As apparent therefrom, the resource sensing procedure is illustrated separately from the sequence of steps to be performed by the UE to transmit data that is pending for transmission. Using dashed lines, FIG. 10 illustrates how information provided by the resource sensing procedure, such as the radio resource reservations or the energy predictions made during the sensing window, can be used as input in various steps of the procedure. For instance, the UE-autonomous radio resource allocation can exclude reserved radio resources from the selection, so as to avoid interference. Also, the selection of the appropriate T-RPT can also be based on the information acquired by the sensing procedure, as will be explained in more detail in connection with further implementations of the embodiment.

A first detailed implementation of the general first embodiment discussed above will be explained in connection with FIGS. 11 and 12, which both illustrate a sequence of subframes of a transmission window and the corresponding timing of data transmissions, including an initial transmission and three retransmissions of data. In the exemplary illustration, the transmission window is depicted so as to include subframe P at which the data becomes available as well as subframe L which is considered the latest subframe while still complying with the delay requirement of the data. The transmission window can also be defined differently, e.g., not including subframe 10 or even further subsequent subframes 11, . . . , in order to take a processing time into account.

Figure 11:
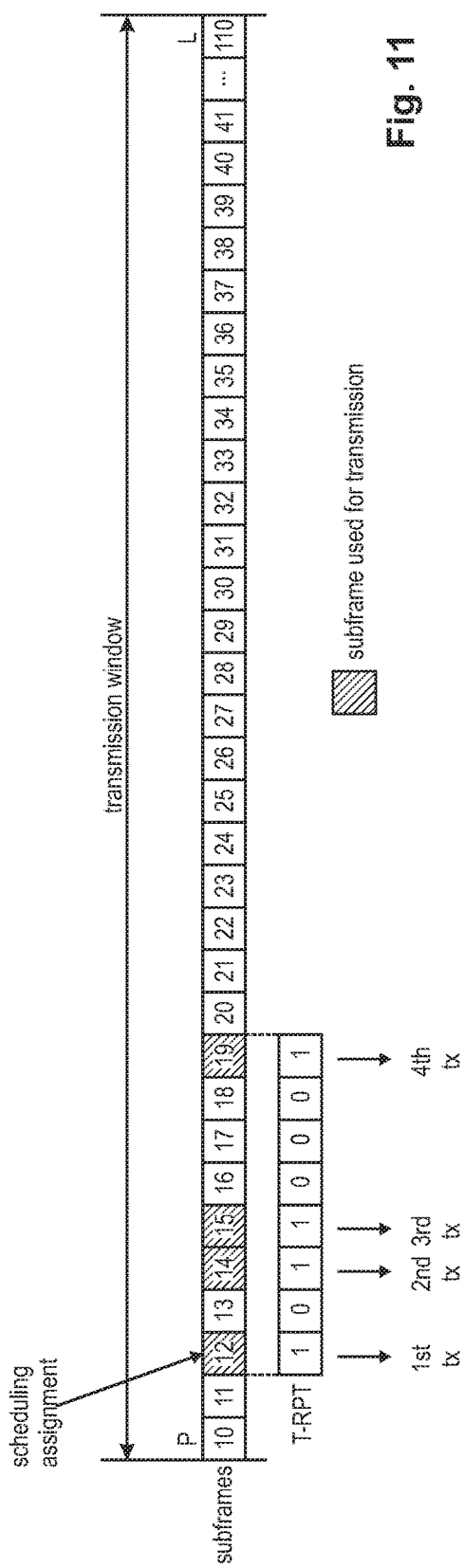
FIGS. 11 and 12 illustrate a sequence of subframes for a transmission window and the initial data transmission and data retransmissions according to exemplary implementations of the first embodiment.

In both figures it is assumed that the vehicular UE determines time-frequency radio resources in subframe 12 to be optimal for the first data transmission. The corresponding indication would be included in the corresponding scheduling assignment such that the receiving entities are able to receive the data. As assumed so far, four transmissions are to be performed in total for data (e.g., one transport block) so as to increase the transmission reliability. In this implementation, the vehicular UE would thus select the T-RPT according to the total number of transmissions that are to be performed. There are two variants depicted in FIGS. 11 and 12, distinguishing whether or not the T-RPT includes or does not include the initial data transmission. In the variant illustrated in FIG. 11, the vehicular UE would thus select the T-RPT among T-RPTs having four total transmissions; an exemplary T-RPT that could be selected by the vehicular UE is shown in FIG. 11. On the other hand, in the variant illustrated in FIG. 12, the vehicular UE would thus select the T-RPT among T-RPTs having three transmissions in total in view of that the first transmission is not comprised by the T-RPT.

Figure 12:
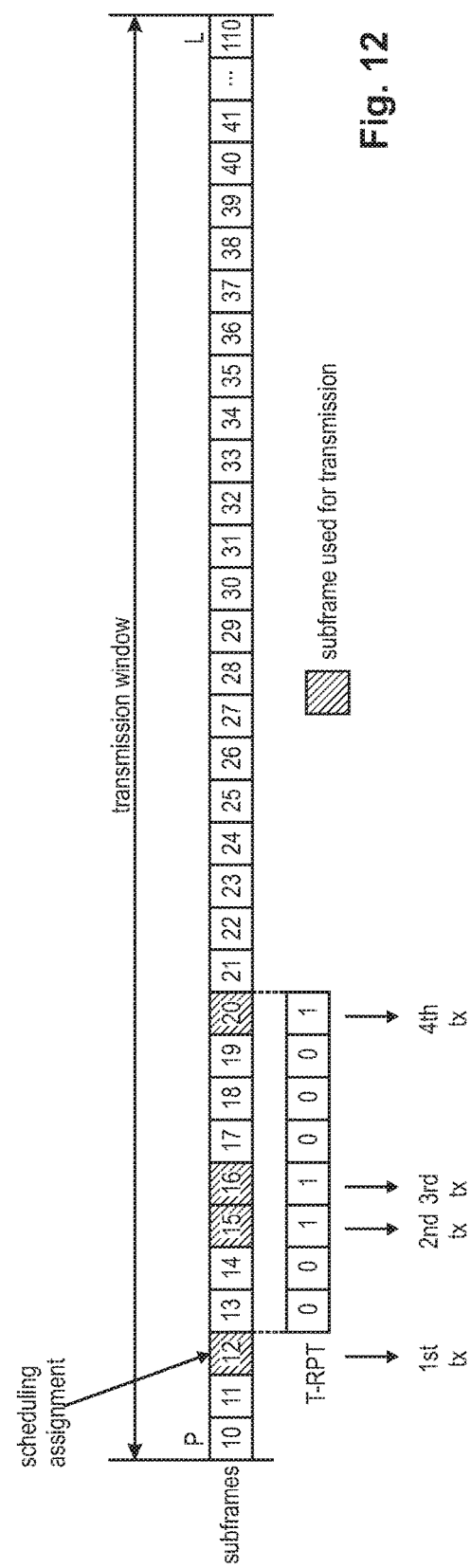

The T-RPT in the variant of FIG. 12 exemplarily starts immediately after the subframe in which the initial transmission is performed. Alternatively, while still using subframe 12 (i.e., the timing of the first data transmission) as a reference for the start of the T-RPT (and thus the retransmission timings), a different timing offset from the first data transmission timing could be used. For instance, the T-RPT may start at a distance of one or more subframes from the first data transmission. The timing offset may be either configurable (e.g., by the vehicular UE or the eNodeB) or predetermined, but needs to be known to the receiving entities.

Furthermore, the retransmissions performed at the various subframes (subframes 14, 15, and 19 in the variant of FIG. 11, or subframes 15, 16, and 20 in the variant of FIG. 12), can use either the same frequencies as already used for the first data transmission or can use "hopped" frequencies derived from the frequencies used for the first data transmission (based on a known frequency hopping pattern).

As mentioned above, the selection of the T-RPT is restricted by the number of total transmissions (see FIG. 11) or number of retransmissions (see FIG. 12). Apart from this restriction, in one exemplary variant, the vehicular UE may randomly determine the T-RPT (having the necessary number of (re)transmissions) among all those T-RPTs having said necessary number of (re)transmissions. Although this would be a simple implementation, this may have the disadvantage that the randomly chosen timing pattern can result in retransmission timings (subframes) that would cause severe interference with transmissions of other devices; as noted above, the frequency resources are fixed by the frequency resources selected for the initial data transmission, either being the same frequency resources or following a frequency hopping pattern therefrom.

Alternatively, instead of randomly determining the T-RPT, the vehicular UE can take the results of the sensing procedure into account as far as possible. In particular, the same physical resource blocks that are reserved in one subframe can be available in another subframe, such that the vehicular UE shall—as much as possible—reduce the interference with transmissions from other UEs by appropriately selecting the T-RPT based on the sensed information.

Similarly, whether or not to use hopping for the frequency domain resources can also be based on the results of the sensing procedure, such that the vehicular UE chooses to use hopping or not hopping for the frequency domain depending on which frequency resources e.g., would presumably cause the least interference.

The determination of the timing pattern as well as whether or not to use frequency hopping are interrelated since different frequencies at different subframes will lead to different collisions and interference. Correspondingly, the appropriate T-RPT as well as whether or not to use frequency hopping can be determined together so as to combine the benefits of selecting an optimal T-RPT and optimal PRBs.

As already mentioned above, the scheduling assignment transmitted for the whole data transmission needs to indicate the time-frequency resources for the initial data transmission as well as the selected T-RPT, which is the main information for the receiving entities to derive the timing of the first as well as of the remaining retransmissions of the data. Optionally, the scheduling assignment may further include information on whether frequency hopping is used or not with regard to the frequencies used for the initial transmission. Correspondingly, the scheduling assignment is compact and does not cause a high signaling overhead.

The retransmission of the data will thus be completed within the time period given by the determined T-RPT, in this exemplary case within 7 (see FIG. 11) or 8 (see FIG. 12) subframes. In other words, the retransmissions must be performed within a time window which is relatively short, especially compared to the exemplary delay requirement of 100 ms. This reduces the flexibility of the vehicular UE to transmit the retransmissions. Although one variant also takes into account the sensing results. The probability of collisions with data transmissions by other UEs can still be high and may be hardly avoided, due to the very limited flexibility of the discussed variants as there are only a few different T-RPTs within a very short time frame.

Further implementations of the first embodiment are provided in the following so as to improve the above discussed variants of the first embodiment. As will be explained in connection with FIGS. 13 and 14, instead of restricting the retransmissions to a particular timeframe given by the length of the timing pattern (as in FIGS. 11 and 12), another exemplary implementation of the first embodiment extends the retransmission possibilities throughout the whole remaining transmission window. In particular, in the same manner as explained above in connection with FIGS. 11 and 12, the vehicular UE shall perform the radio resource allocation for determining optimal radio resources for the first transmission of the data, based on the information obtained by the resource sensing procedure. In the present example it is assumed that the vehicular UE determines optimal time-frequency radio resources in subframe 14, such that the initial transmission is performed in those determined frequencies of subframe 14.

Figure 13:
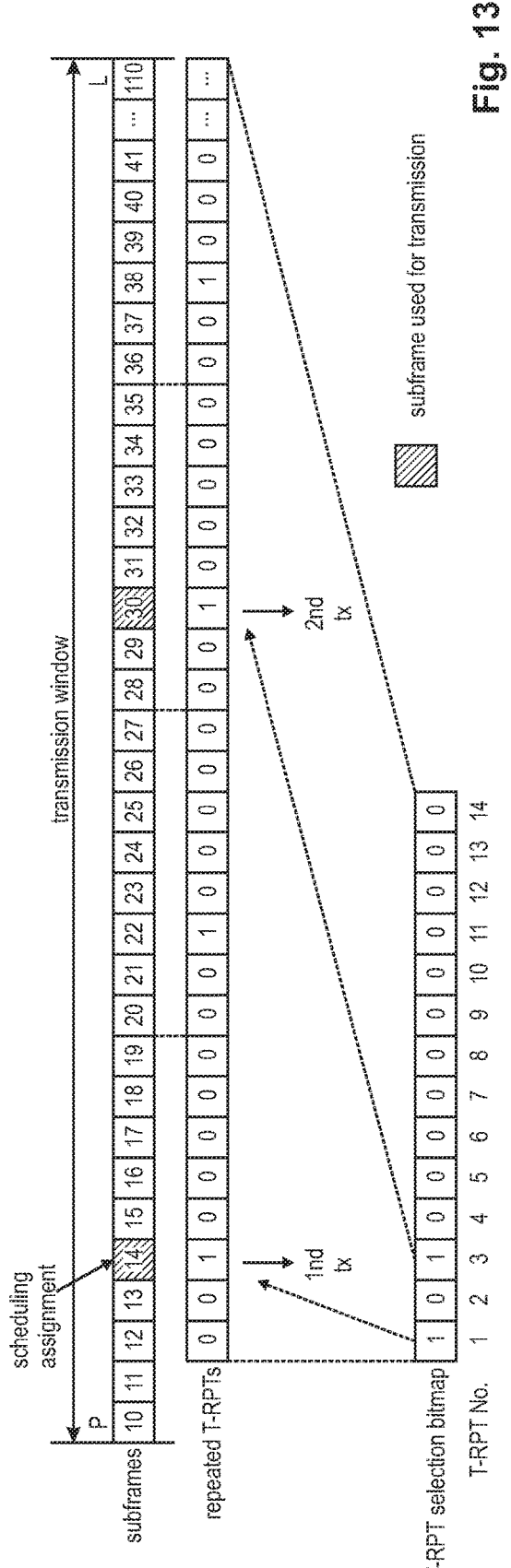
FIGS. 13 and 14 illustrate a sequence of subframes for a transmission window and the initial data transmission and data retransmissions according to further exemplary implementations of the first embodiment.
Figure 14:
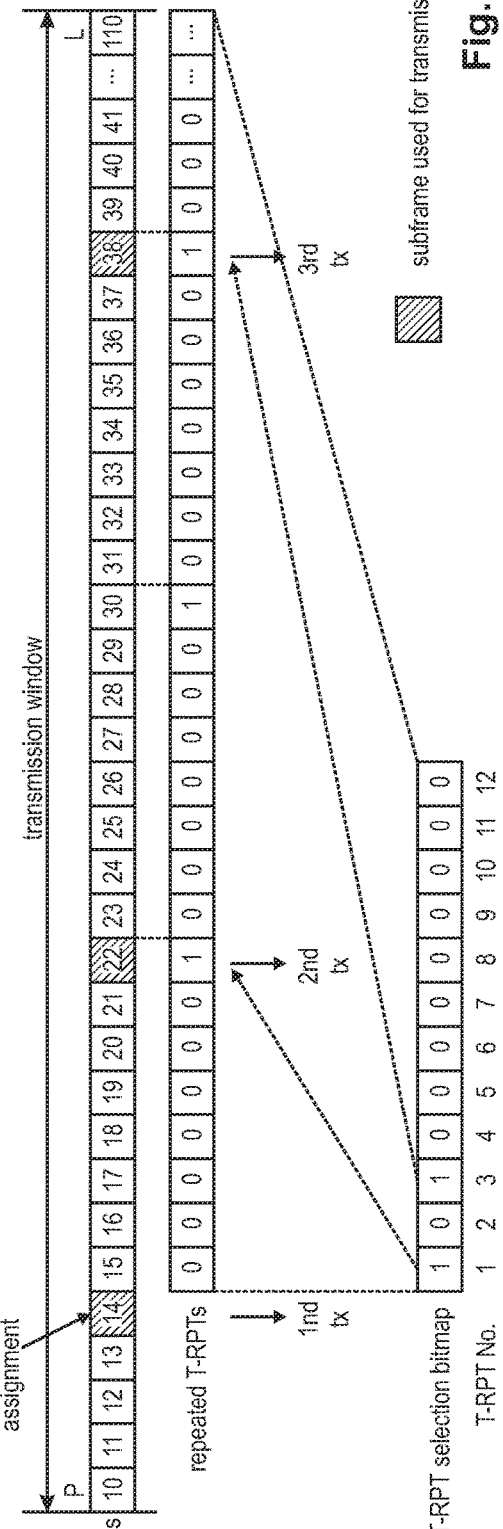

On the other hand, a data transmission timing pattern is selected by the vehicular UE that comprises only one transmission, i.e., only one transmission for the whole T-RPT. This one-transmission T-RPT is however then repeated throughout the remaining transmission window after the first transmission and having the first data transmission timing as a reference so as to thus define several data retransmission candidates. For instance, as illustrated in FIG. 14, the repeated T-RPTs can start at the next subframe after the first data transmission timing (other timing offsets from the first data transmission timing are possible as well, as discussed above in connection with FIG. 12). Alternatively, as illustrated in FIG. 13, the repeated T-RPTs start such that the first of the repeated T-RPTs (more precisely the "1" in that first T-RPT bitmap) coincides with the first data transmission timing.

By thus positioning the repeated T-RPTs after the first data transmission timing, each T-RPT defines one data retransmission candidate, namely at those subframes where the repeated T-RPT indicates the one transmission. The data retransmission candidates are thus distributed throughout the remaining transmission window (e.g., after the first data transmission timing) and are equally spaced from one another in accordance with a length of the T-RPT. For instance, in the exemplary implementation given in FIG. 13, the first data transmission is defined to occur in subframe 14, such that the data retransmission candidates would be in subframes 22, 30, 38, 46 . . . 110 (each having a distance in between of 8 subframes, coinciding with the length of the T-RPT). Given the assumption that the transmission window is 100 ms and the transmission pattern is 8 bits, there can be a maximum of in between 12 (e.g., for FIG. 14) and up to 14 (e.g., for FIG. 13) different data retransmission candidates (also depending on the actual implementation used). The last T-RPT can be truncated and thus may or may not yield another data retransmission opportunity depending on the position of the "1" data transmission within the (truncated) T-RPT.

The vehicular UE then can select data retransmission candidates, among the thus defined data retransmission candidates, to be indeed used for the data retransmissions. The determination of course again depends on the number of total transmissions (i.e., number of total retransmissions). In the exemplary scenario assumed for FIG. 13, it is assumed that only two total transmissions are to be performed, i.e., only one retransmission is needed, such that only one out of the available data retransmission candidates has to be selected by the vehicular UE. In the exemplary scenario illustrated in FIG. 13, it is assumed that the vehicular UE decides to transmit the single data retransmission at subframe 30, which is associated with the third of the sequence of T-RPTs. In the exemplary scenario illustrated in FIG. 14, it is assumed that three total data transmissions are to be performed by the vehicular UE, and thus two retransmission candidates have to be selected by the vehicular UE; assumed to be in subframes 22 and 38, i.e., again the first and third of the repeated T-RPTs.

In order for the receiving entities to know where the vehicular UE will perform the first transmission and the retransmission(s), the scheduling assignment shall not only indicate the time-frequency radio resources for the first transmission and the selected T-RPT (as already discussed before), but also information on the data retransmission candidates the vehicular UE will actually use for data (re)transmission. One possible option on how to indicate the used data retransmission candidates among all candidates is to provide a bitmap (e.g., called T-RPT selection bitmap) in the scheduling assignment, wherein the bits of the T-RPT selection bitmap are associated with the repeated T-RPTs thereby uniquely identifying one of the repeated T-RPTs. As illustrated in FIGS. 13 and 14, the T-RPT selection bitmap can be of different length depending on the implementation and should have a length so as to be able to flexibly indicate all data retransmission candidates. As apparent from the figures, the "1" in the T-RPT selection bitmap points to that T-RPT the vehicular UE actually used for performing the retransmission. The T-RPT selection bitmap is to be included in the scheduling assignment, which although slightly increasing the signaling overhead provides the benefit of greatly increasing the flexibility for performing the retransmissions.

In order to improve the retransmission reliability and reduce possible collisions with other data transmissions, the vehicular UE may determine the one-transmission T-RPT as well as the data retransmission candidates to be actually used for the retransmissions based on the results obtained from the sensing procedure. In particular, there are at most 8 different one-transmission T-RPTs (assuming 8-bit T-RPTs) each of which would respectively define different data retransmission candidates throughout the transmission window. Furthermore, among the thus defined data retransmission candidates (for instance 13 candidates), there are several different combination of candidates to perform the data retransmissions. Overall, depending on the one-transmission T-RPT and the resulting options to perform the data retransmissions, the vehicular UE shall select that combination of T-RPT and data retransmission candidate(s) that would yield e.g., the least interference according to the predictions obtained from the sensing procedure.

Moreover, the vehicular UE may either use the same frequencies as used for the initial data transmission, or it may use frequencies derived from the frequencies of the first data transmission based on a hopping pattern. As explained before, also this decision can be based on the results of the sensing procedure, e.g., taking into account that radio resource reservations may be different from one PRB to the other within a single subframe. Consequently, there can be three different levels of freedom available for the vehicular UE so as to optimize the data retransmission reliability; i.e., the one-transmission T-RPT, the actually-used retransmission candidates among all the retransmission candidates, and the frequency resources being based on hopping or not. The three freedom levels are interrelated and can be chosen together based on the sensing results obtained before during the sensing window so as to benefit as much as possible from the sensing results while allowing a simple (re)transmission procedure.

Figure 15:
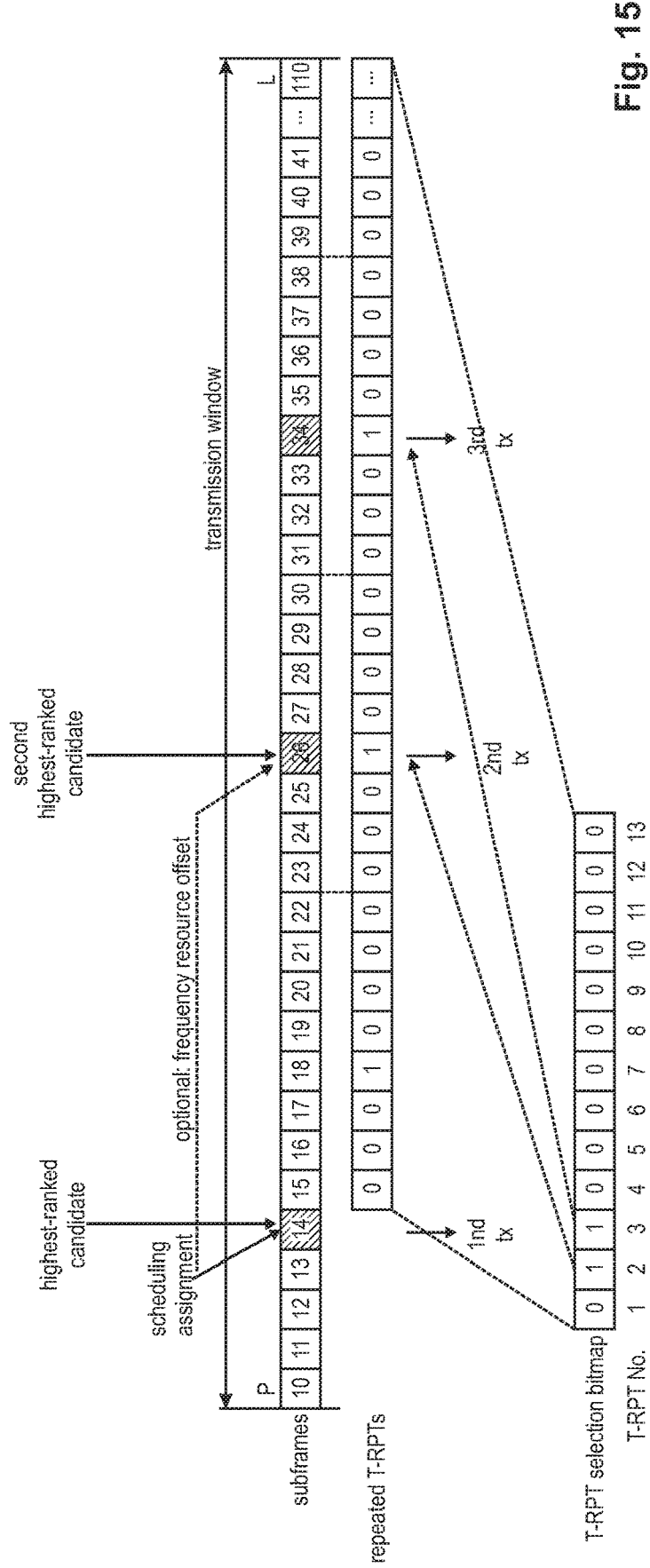
FIG. 15 illustrates a sequence of subframes for a transmission window and the initial data transmission and data retransmissions according to an improved implementation of the first embodiment.

According to another implementation, the solution as presented and discussed in connection with FIGS. 13 and 14 is further improved by selecting one of the data retransmission resources based on the sensing results as follows. In particular, FIG. 15 illustrates a sequence of subframes of a transmission window available for a UE to transmit data, and is similar to FIG. 14 discussed above. In the same manner as for the solution presented in connection with FIGS. 13 and 14, the vehicular UE shall perform the radio resource allocation procedure for determining optimal radio resources for the first data transmission, based on information obtained by the resource sensing procedure. Further, a one-transmission T-RPT is to be selected by the vehicular UE, which is repeatedly positioned throughout the remaining transmission window with the first data transmission as a reference. Differently than the previous solutions, in order to determine the T-RPT, the vehicular UE first shall determine an optimal retransmission candidate within the remaining transmission window (i.e., after the first data transmission), based on the sensing results. Based on the sensing results, the vehicular UE can freely select the frequency and time resources for this preferred retransmission candidate such that collision with transmissions by other UEs can be avoided.

The time position of this selected preferred retransmission candidate then is used by the vehicular UE for determining the T-RPT. This will be explained in connection with FIG. 15. It is exemplarily assumed that a preferred retransmission candidate is found in subframe 26 (e.g., it is the second-highest-ranked candidate, whereas the highest-ranked candidate is selected by the UE to be used for the first transmission of data). Exemplarily assuming that the positioning of the repeated T-RPTs of length 8 bit starts immediately after the first data transmission (see FIG. 15), the vehicular UE would thus select the T-RPT 00010000, such that one of the "1" of the repeated T-RPTs coincides with the preferred data retransmission candidate selected before (see subframe 26). Correspondingly, one of the data retransmissions performed by the vehicular UE shall take place at subframe 26 on the frequencies as selected during the resource allocation procedure based on the sensing results (i.e., the used frequencies at subframe 26 can be different from those frequencies used for the initial data transmission in subframe 14). Exemplarily, in FIG. 15 it is assumed that the first data retransmission is performed at the preferred data retransmission candidate, while a further retransmission is performed at the next retransmission possibility at subframe 34. The T-RPT selection bitmap already mentioned before, would have to indicate these retransmissions, and thus indicates the second and third T-RPT as being used by the vehicular UE for the data retransmissions.

As already explained in the preceding implementation, the vehicle UE may have to select further data retransmission candidates among the remaining data retransmission candidates. This may be done for instance by using the results of the sensing procedure so as to avoid collisions with transmissions of other UEs.

This improved solution of FIG. 15 produces a reduced collision rate and thus increases the transmission reliability of the data by additionally selecting the time and frequency resources for one of the data retransmissions freely based on the sensing results obtained earlier. However, this solution increases the signaling overhead slightly. As already discussed before for the implementation according to FIGS. 13 and 14, the scheduling assignment transmitted by the vehicular UE for the data indicates the time-frequency radio resources for the first data transmission as well as the selected T-RPT and the T-RPT selection bitmap. While the T-RPT in combination with the T-RPT selection bitmap and taking the first data transmission timing as a reference, uniquely identify the timing of all of the remaining data retransmissions, the receiving entities need to know about the frequencies that are used by the vehicular UE to transmit the data retransmission at the preferred radio resources (see e.g., subframe 26 above) since the frequencies are freely selected based on the sensing results and thus will not coincide with the frequencies already indicated in the scheduling assignment for the first data transmission (or do not comply with a frequency hopping pattern). One solution is thus to include information on the other frequencies used for this one retransmission at subframe 26; this can be done by explicitly identifying the frequencies or by including a frequency offset from the frequencies used for the first data transmission. The frequency offset may be used by the receiving entities to determine the frequencies used for that one data retransmission at subframe 26.

Moreover, the same frequencies as used for the first or the one preferred data retransmission can also be used for transmitting the remaining data retransmissions. Alternatively, a hopping frequency pattern with regard to the frequencies used for the first data transmission or the preferred data retransmission can be used for the remaining data retransmissions. A corresponding frequency hopping indication in the scheduling assignment appropriately informs the receiving entities in said respect.

A further improvement for the radio resource allocation performed for an initial data transmission and data retransmissions will be explained in the following. According to an exemplary implementation, the data resource pool, which comprises a plurality of time-frequency radio resources as illustrated in a simplified manner in FIG. 9, is divided into time-frequency radio resources that are only available for performing first data transmissions while the remaining time-frequency radio resources in the data resource pool are only available for performing data retransmissions. Alternatively, two different data resource pools can be provided, one data resource pool for initial data transmissions and the other data resource pool for data retransmissions. In any case, during the resource allocation procedure, the vehicular UE uses different resources for an initial transmission and a data retransmission. The data resource pool segregation shall apply e.g., to all vehicular UEs in a corresponding cell. Therefore, by segregating the available resources for data transmissions between initial data transmissions and data retransmissions, it is possible to protect the initial transmission even further, since collisions with retransmissions are theoretically not possible.

The segregation of the available time-frequency resources can be done in various manners. For instance, a corresponding formula can be provided which is then used by the vehicular UE as well as by other UEs to determine which time-frequency radio resources are to be used for initial data transmissions and which are to be used for data retransmissions. A simple formula can e.g., be based on the modulo operation. Further, the different data resource pools for initial data transmissions and data retransmissions can be configured by the eNodeB, by appropriately broadcasting system information.

In one particular exemplary variant, the segregation is performed in the time domain such that subframes are either used for initial transmissions or retransmissions.

This improvement can be e.g., applied to the implementation discussed in connection with FIG. 9 where the vehicle UE performs a radio resource allocation procedure for each (re)transmission. Further, the improvement can also be applied to the implementation as discussed above in connection with FIG. 11-15. For instance, with regard to the solutions presented in FIGS. 11 and 12, a further improved solution would perform the radio resource selection for the first transmission among time-frequency resources available for the initial transmission only. Then, the selected T-RPT pattern (selected randomly or based on the sensing results) would indicate only subframes that are indeed available in the data resource pool directed to data retransmissions. FIG. 16 exemplarily illustrates an implementation where subframes that are not available for the retransmissions are crossed out. For instance, it is assumed that only every third subframe is available for a retransmission, in particular subframes 14, 17, 20, 23, 26, 29 etc. As apparent, the bits of the T-RPT bitmap correspondingly indicate only subframes that are indeed available for retransmissions (with the exception of the first bit of the T-RPT in this variant, which is assumed to indicate the first transmission). As a result, using the same T-RPT bitmap as in the exemplary scenario used for FIG. 11 (10110001), the vehicular UE would perform the retransmissions at subframes 17, 20, and 32.

Similarly, for the implementations according to FIGS. 13, 14 and 15, the repeated T-RPT patterns would be repeated throughout subframes of the transmission window belonging to the retransmission-restricted data resource pool. As regards the solution in FIG. 15, the radio resource allocation performed exclusively for the one preferred data retransmission (in subframe 26) would select resources within the retransmission-restricted data resource pool.

Further Embodiments

According to a first aspect, a transmitting device is provided for transmitting data via a sidelink interface to one or more receiving devices. The transmission of the data comprises a first transmission of the data and, after the first data transmission, one or more retransmissions of the data. A receiver and a processor of the transmitting device perform a resource sensing procedure so as to acquire information about radio resources usable for the transmitting device to transmit data at a later point in time. The processor, after data becomes available for transmission, performs an autonomous radio resource allocation to select time-frequency radio resources within a transmission window to be used for performing a first transmission of the data, based on the information acquired by the resource sensing procedure during a sensing window before the data became available for transmission. The processor determines a data transmission timing pattern among a plurality of data transmission timing patterns, each data transmission timing pattern indicating a transmission timing for performing one or more transmissions of data. A transmitter of the transmitting device performs the first data transmission using the selected time-frequency radio resources and performs the one or more data retransmissions at the transmission timing defined by the determined data transmission timing pattern with respect to the first data transmission.

According to a second aspect which is provided in addition to the first aspect, the plurality of data transmission timing patterns indicates a different number of data transmissions. The processor determines one data transmission timing pattern among data transmission timing patterns corresponding to a total number of transmissions to be performed for the data; in one optional implementation, the total number of transmissions to be performed for the data is determined by the processor or is preconfigured. According to one option, the one or more data retransmissions are performed within a time span defined by the length of the one determined data transmission timing pattern. The data transmission timing pattern is determined by the processor either randomly or based on the information acquired by the resource sensing procedure during the sensing window.

According to a third aspect which is provided in addition to one of the first to second aspects, the transmitter transmits a scheduling assignment indicating the selected time-frequency radio resources for the first data transmission and identifying the determined data transmission timing pattern.

According to a fourth aspect in addition to the first aspect, the determined data transmission timing pattern indicates only one data transmission. The processor determines data retransmission candidates within the transmission window for performing the one or more data retransmissions by repeating the determined data transmission timing pattern a plurality of times within the transmission window with respect to the timing of the first data transmission and by then identifying the timing position given by the one indicated data transmission per repeated data transmission timing pattern. The processor determines which data retransmission candidates are to be used for performing the one or more data retransmissions, which may be optionally done depending on a total number of transmissions to be performed for the data, where the total number of data transmissions can be determined by the processor or be preconfigured, According to an option, the processor determines the data transmission timing pattern as well as the data retransmission candidates to be used for the data retransmission based on the information acquired by the resource sensing procedure during the sensing window.

According to a fifth aspect in addition to one of the first to fourth aspects, the one or more data retransmissions are performed using the same frequency radio resources as used for the first data transmission or using frequency radio resources determined by the processor from the frequency radio resources used for the first data transmission based on a frequency hopping pattern. According to an option, the processor determines for the one or more data retransmissions whether to use the same frequency radio resources as for the first data transmission or to use frequency radio resources following the frequency hopping pattern, based on the information acquired by the resource sensing procedure during the sensing window. According to further option, the scheduling assignment further indicates whether or not a frequency hopping pattern is used by the transmitting device for determining frequency radio resources used for transmitting the one or more data retransmissions.

According to a sixth aspect in addition to the first aspect, the determined data transmission timing pattern indicates only one transmission. The processor determines a preferred transmission timing, after the first data transmission timing, for one of the one or more data retransmission based on the information acquired by the resource sensing procedure during the sensing window. The processor determines the data transmission timing pattern such that the one indicated data transmission of the data transmission timing pattern coincides with the determined preferred transmission timing when the data transmission timing pattern is repeated a plurality of times within the transmission window with respect to the timing of the first data transmission. Data retransmission candidates are defined within the transmission window for performing one or more of the data retransmissions, by repeating the data transmission timing pattern and by then identifying the timing position given by the one indicated data transmission per repeated data transmission timing pattern. The processor determines which data retransmission candidates are to be used for performing remaining data retransmissions, which can be optionally done based on the information acquired by the resource sensing procedure during the sensing window and depending on a total number of transmissions to be performed for the data. The total number of data transmissions can be determined by the processor or be preconfigured, The transmitter transmits one data retransmission at the determined preferred transmission timing, and transmits the remaining data retransmissions at the retransmission candidates determined to be used.

According to the seventh aspect in addition to the sixth aspect, a scheduling assignment transmitted by the transmitter indicates the frequency radio resources for the data retransmission at the preferred transmission timing. For instance, the indication of the frequency resources for the data retransmission at the preferred transmission timing can be an offset with respect to the frequency radio resources for the first data transmission. According to an option, the remaining data retransmissions are performed using the same frequency radio resources as used for the first data transmission or the same frequency radio resources as used for the data retransmission at the preferred transmission timing. Alternatively, the remaining data retransmissions are performed using frequency radio resources determined by the processor based on a frequency hopping pattern from the frequency radio resources used for the first data transmission or from the frequency radio resources used for the data retransmission at the preferred transmission timing. Correspondingly, the scheduling assignment further indicates whether or not a frequency hopping pattern is used by the transmitting device for determining frequency radio resources used for transmitting the one or more data retransmissions.

According to eighth aspect in addition to one of the fourth to seventh aspects, the transmitter transmits a scheduling assignment indicating the selected time-frequency radio resources for the first data transmission and identifying the determined data transmission timing pattern. The scheduling assignment further indicates which data transmission timing pattern among the plurality of repeated data transmission timing patterns define the transmitting timing for performing the one or more data retransmissions. Optionally, the data transmitting timing pattern indication is encoded as a bitmap, wherein bits of the bitmap are respectively associated with one of the plurality of repeated data transmission timing patterns.

According to ninth aspect in addition to one of the first to eighth aspects, the data transmission timing pattern has a length of a plurality of bits. Each bit of the data transmission timing pattern indicates whether or not a transmission of the data is to be performed at a transmission timing associated with the respective bit position. Optionally, the data transmission timing pattern is positioned in the timing window with respect to the first data transmission so as to also indicate or not indicate the first data transmission.

According to tenth aspect in addition to one of the first to ninth aspects, a data resource pool comprises a plurality of time-frequency radio resources available for the transmitting device to perform data transmissions. The data resource pool is divided into time-frequency radio resources available for performing first data transmissions and into time-frequency radio resources available for performing data retransmissions. Then, the processor selects, during the autonomous radio resource allocation, time-frequency radio resources to be used for performing the first data transmission among the time-frequency radio resources available for performing first data transmissions. Optionally, the plurality of time-frequency radio resources of the data resource pool is divided in the time domain between time-frequency radio resources for first data transmissions and for data retransmissions. As a further option, the division of the data resource pool is preconfigured or configured by a radio base station controlling the transmitting device.

According to eleventh aspect in addition to one of the seventh to tenth aspects, the resource sensing procedure comprises:
  in order to determine radio resources that are reserved by other transmitting devices, the receiver and processor, when in operation, monitor for scheduling assignments transmitted by other transmitting devices indicating radio resources reserved by the other transmitting devices for a later point in time, and
  optionally measures a received signal energy in radio resources so as to identify radio resources that are used by other transmitting devices for transmission, As an option, the autonomous radio resource allocation comprises excluding the radio resources reserved by other transmitting devices from the plurality of transmission radio resources.

According to a twelfth aspect, a method is provided for a transmitting device for transmitting data via a sidelink interface to one or more receiving devices. The transmission of the data comprises a first transmission of the data and, after the first data transmission, one or more retransmissions of the data. The method comprises the following steps performed by the transmitting device. A resource sensing procedure is performed so as to acquire information about radio resources usable for the transmitting device to transmit data at a later point in time. After data becomes available for transmission, an autonomous radio resource allocation is performed to select time-frequency radio resources within a transmission window to be used for performing a first transmission of the data, based on the information acquired by the resource sensing procedure during a sensing window before the data became available for transmission. The transmitting device determines a data transmission timing pattern among a plurality of data transmission timing patterns, each data transmission timing pattern indicating a transmission timing for performing one or more transmissions of data. The transmitting device perform the first data transmission using the selected time-frequency radio resources and performs the one or more data retransmissions at the transmission timing defined by the determined data transmission timing pattern with respect to the first data transmission.

According to a thirteenth aspect provided in addition to the twelfth aspect, the plurality of data transmission timing patterns indicates a different number of data transmissions. The method comprises determining one data transmission timing pattern among data transmission timing patterns corresponding to a total number of transmissions to be performed for the data. Optionally, the total number of transmissions to be performed for the data is determined by the transmitting device or is preconfigured. Optionally, the one or more data retransmissions are performed within a time span defined by the length of the one determined data transmission timing pattern. Optionally, the data transmission timing pattern is determined by the transmitting device either randomly or based on the information acquired by the resource sensing procedure during the sensing window.

According to a fourteenth aspect provided in addition to the twelfth or thirteenth aspect, the method further comprises the step of transmitting a scheduling assignment that indicates the selected time-frequency radio resources for the first data transmission and identifies the determined data transmission timing pattern.

According to a fifteenth aspect provided in addition to the twelfth aspect, the determined data transmission timing pattern indicates only one data transmission. The method comprises the step of determining data retransmission candidates within the transmission window for performing the one or more data retransmissions by repeating the determined data transmission timing pattern a plurality of times within the transmission window with respect to the timing of the first data transmission and by then identifying the timing position given by the one indicated data transmission per repeated data transmission timing pattern. The method comprises the step of determining which data retransmission candidates are to be used for performing the one or more data retransmissions, which may optionally depend on a total number of transmissions to be performed for the data, where the total number of data transmissions being determined by the processor or being preconfigured. Optionally, the method comprises the step of determining the data transmission timing pattern as well as the data retransmission candidates to be used for the data retransmission based on the information acquired by the resource sensing procedure during the sensing window.

According to a sixteenth aspect provided in addition to one of the twelfth to fifteenth aspects, the one or more data retransmissions are performed using the same frequency radio resources as used for the first data transmission or using frequency radio resources determined from the frequency radio resources used for the first data transmission based on a frequency hopping pattern. Optionally, the method comprises the step of determining for the one or more data retransmissions whether to use the same frequency radio resources as for the first data transmission or to use frequency radio resources following the frequency hopping pattern, based on the information acquired by the resource sensing procedure during the sensing window. Optionally, the scheduling assignment further indicates whether or not a frequency hopping pattern is used by the transmitting device for determining frequency radio resources used for transmitting the one or more data retransmissions.

According to a seventeenth aspect provided in addition to the twelfth aspects, the determined data transmission timing pattern indicates only one transmission. The method comprises the step of determining a preferred transmission timing, after the first data transmission timing, for one of the one or more data retransmission based on the information acquired by the resource sensing procedure during the sensing window. The method comprises the step of determining the data transmission timing pattern such that the one indicated data transmission of the data transmission timing pattern coincides with the determined preferred transmission timing when the data transmission timing pattern is repeated a plurality of times within the transmission window with respect to the timing of the first data transmission. Data retransmission candidates are defined within the transmission window for performing one or more of the data retransmissions, by repeating the data transmission timing pattern and by then identifying the timing position given by the one indicated data transmission per repeated data transmission timing pattern. The method comprises the step of determining which data retransmission candidates are to be used for performing remaining data retransmissions, which may be optionally based on the information acquired by the resource sensing procedure during the sensing window and depending on a total number of transmissions to be performed for the data, where the total number of data transmissions being determined by the transmitting device or being preconfigured. The method comprises the step of transmitting one data retransmission at the determined preferred transmission timing, and transmitting the remaining data retransmissions at the retransmission candidates determined to be used.

According to an eighteenth aspect in addition to the seventeenth aspect, a scheduling assignment transmitted by the transmitter indicates the frequency radio resources for the data retransmission at the preferred transmission timing, optionally as an offset with respect to the frequency radio resources for the first data transmission. Optionally, the remaining data retransmissions are performed using the same frequency radio resources as used for the first data transmission or the same frequency radio resources as used for the data retransmission at the preferred transmission timing. Alternatively, the remaining data retransmissions are performed using frequency radio resources determined by the processor based on a frequency hopping pattern from the frequency radio resources used for the first data transmission or from the frequency radio resources used for the data retransmission at the preferred transmission timing. The scheduling assignment further indicates whether or not a frequency hopping pattern is used by the transmitting device for determining frequency radio resources used for transmitting the one or more data retransmissions.

According to a nineteenth aspect provided in addition to one of the fifteenth to the eighteenth aspects, wherein the method further comprises the step of transmitting a scheduling assignment indicating the selected time-frequency radio resources for the first data transmission and identifying the determined data transmission timing pattern. The scheduling assignment further indicates which data transmission timing pattern among the plurality of repeated data transmission timing patterns define the transmitting timing for performing the one or more data retransmissions. Optionally, the data transmitting timing pattern indication is encoded as a bitmap, wherein bits of the bitmap are respectively associated with one of the plurality of repeated data transmission timing patterns.

According to a twentieth aspect provided in addition to one of the twelfth to nineteenth aspects, the data transmission timing pattern has a length of a plurality of bits, and each bit of the data transmission timing pattern indicates whether or not a transmission of the data is to be performed at a transmission timing associated with the respective bit position. Optionally, the data transmission timing pattern is positioned in the timing window with respect to the first data transmission so as to also indicate or not indicate the first data transmission.

According to a twenty-first aspect provided in addition to one of the twelfth to twentieth aspects, a data resource pool comprises a plurality of time-frequency radio resources available for the transmitting device to perform data transmissions. The data resource pool is divided into time-frequency radio resources available for performing first data transmissions and into time-frequency radio resources available for performing data retransmissions. The method comprises the step of selecting, during the autonomous radio resource allocation, time-frequency radio resources to be used for performing the first data transmission among the time-frequency radio resources available for performing first data transmissions. Optionally, the plurality of time-frequency radio resources of the data resource pool is divided in the time domain between time-frequency radio resources for first data transmissions and for data retransmissions. Optionally, the division of the data resource pool is preconfigured or configured by a radio base station controlling the transmitting device.

Hardware and Software Implementation of the Present Disclosure

Other exemplary embodiments relate to the implementation of the above described various embodiments using hardware, software, or software in cooperation with hardware. In this connection a user terminal (mobile terminal) is provided. The user terminal is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit configured to control operation of a transmitting device for transmitting data via a sidelink interface to one or more receiving devices, wherein the data transmission includes an initial data transmission and one or more data retransmissions, the integrated circuit comprising:
receiving circuitry, which, in operation, performs a resource sensing procedure to acquire information about radio resources usable by the transmitting device;
control circuitry, which, in operation,
responsive to data becoming available for transmission, performs an autonomous radio resource allocation to select time-frequency radio resources within a transmission window for the initial data transmission, based on the information acquired in the resource sensing procedure during a sensing window before the data becoming available for transmission, and determines a data transmission timing pattern among a plurality of data transmission timing patterns, each data transmission timing pattern indicating a data transmission timing; and transmitting circuitry, which, in operation, performs the initial data transmission using the selected time-frequency radio resources, determines, based on the data transmission timing indicated by the determined data transmission timing pattern and a time gap between the initial data transmission and the one or more data retransmissions, a data retransmission timing, and performs the one or more data retransmissions at the retransmission timing, wherein the time gap is configurable, independently of the determined data transmission timing pattern, and is made known to the one or more receiving devices, and wherein the one or more data retransmissions are performed within a time span defined by a length of the determined data transmission timing pattern.

2. The integrated circuit according to claim 1, wherein the plurality of data transmission timing patterns indicate different numbers of data transmissions, and the control circuitry, in operation, determines the data transmission timing pattern among data transmission timing patterns corresponding to a total number of transmissions to be performed for the data, wherein the total number of transmissions is determined by the control circuitry or is preconfigured, and determines the data transmission timing pattern either randomly or based on the information acquired in the resource sensing procedure during the sensing window.

3. The integrated circuit according to claim 1, wherein the transmitting circuitry, in operation, transmits a scheduling assignment indicating the selected time-frequency radio resources for the initial data transmission and identifying the determined data transmission timing pattern.

4. The integrated circuit according to claim 1, wherein the determined data transmission timing pattern indicates only one data transmission, wherein the control circuitry, in operation, determines data retransmission candidates within the transmission window by repeating the determined data transmission timing pattern a plurality of times within the transmission window, determines which of the data retransmission candidates are to be used for performing the one or more data retransmissions, depending on a total number of transmissions to be performed for the data, wherein the total number of transmissions is determined by the control circuitry or is preconfigured, and determines the data transmission timing pattern and which of the data retransmission candidates are to be used based on the information acquired in the resource sensing procedure during the sensing window.

5. The integrated circuit according to claim 4, wherein the transmitting circuitry, in operation, transmits a scheduling assignment indicating the selected time-frequency radio resources for the initial data transmission and identifying the determined data transmission timing pattern, and wherein the scheduling assignment further includes a bitmap, wherein bits of the bitmap are respectively associated with one of the plurality of repeated data transmission timing patterns.

6. The integrated circuit according to claim 1, wherein the one or more data retransmissions are performed using the same frequency radio resources as used for the initial data transmission or using frequency radio resources determined by the control circuitry from the frequency radio resources used for the initial data transmission based on a frequency hopping pattern, or wherein the control circuitry, in operation, determines for the one or more data retransmissions whether to use the same frequency radio resources as for the initial data transmission or to use frequency radio resources following the frequency hopping pattern, based on the information acquired in the resource sensing procedure during the sensing window, and wherein the transmitting circuitry, in operation, transmits a scheduling assignment indicating whether or not a frequency hopping pattern is used by the transmitting device for determining frequency radio resources used for the one or more data retransmissions.

7. The integrated circuit according to claim 1, wherein the determined data transmission timing pattern indicates only one transmission, wherein the control circuitry, in operation, determines a preferred transmission timing, after the initial data transmission timing, for one of the one or more data retransmissions based on the information acquired in the resource sensing procedure during the sensing window, determines the data transmission timing pattern such that the one transmission indicated by the data transmission timing pattern coincides with the preferred transmission timing when the data transmission timing pattern is repeated a plurality of times within the transmission window with respect to the timing of the initial data transmission, determines data retransmission candidates within the transmission window by repeating the data transmission timing pattern, and determines which of the data retransmission candidates are to be used for performing remaining ones of the one or more data retransmissions, based on the information acquired in the resource sensing procedure during the sensing window and depending on a total number of transmissions to be performed for the data, wherein the total number of transmissions is determined by the control circuitry or is preconfigured, and wherein the transmitting circuitry, in operation, performs the one of the one or more data retransmissions at the preferred transmission timing, and performs the remaining ones of the one or more data retransmissions at the retransmission candidates determined to be used.

8. The integrated circuit according to claim 6, wherein the transmitting circuitry, in operation, transmits a scheduling assignment indicating frequency radio resources for the data retransmission at the preferred transmission timing, as an offset with respect to frequency radio resources for the initial data transmission, and wherein the remaining data retransmissions are performed using the same frequency radio resources as used for the initial data transmission or the same frequency radio resources as used for the data retransmission at the preferred transmission timing, or wherein the remaining data retransmissions are performed using frequency radio resources determined by the control circuitry based on a frequency hopping pattern from the frequency radio resources used for the initial data transmission or from the frequency radio resources used for the data retransmission at the preferred transmission timing, and wherein the scheduling assignment further indicates whether or not a frequency hopping pattern is used by the transmitting device for determining frequency radio resources used for the one or more data retransmissions.

9. The integrated circuit according to claim 1, wherein the data transmission timing pattern has a length of a plurality of bits, and each bit of the data transmission timing pattern indicates whether or not a transmission of the data is to be performed at a transmission timing associated with the respective bit position, and wherein the data transmission timing pattern is positioned in the timing window with respect to the initial data transmission so as to also indicate or not indicate the initial data transmission.

10. The integrated circuit according to claim 1, wherein a data resource pool includes a plurality of time-frequency radio resources available for the transmitting device, and the data resource pool is divided into time-frequency radio resources available for performing the initial data transmission and into time-frequency radio resources available for performing the one or more data retransmissions, wherein the control circuitry, in operation, selects, during the autonomous radio resource allocation, the time-frequency radio resources for the initial data transmission among the time-frequency radio resources available for performing the initial data transmission.

11. The integrated circuit according to claim 1, wherein the plurality of time-frequency radio resources in the data resource pool are divided in a time domain between the time-frequency radio resources available for performing the initial data transmission and the time-frequency radio resources available for performing the one or more data retransmissions, and wherein the division of the data resource pool is preconfigured or configured by a radio base station controlling the transmitting device.

12. The integrated circuit according to claim 1, wherein the resource sensing procedure includes:

monitoring scheduling assignments transmitted by other transmitting devices indicating radio resources reserved by the other transmitting devices, and measuring a received signal energy in radio resources to identify radio resources that are used by other transmitting devices, wherein the autonomous radio resource allocation includes excluding the radio resources reserved by the other transmitting devices from usable radio resources.

* * * * *